United States Patent
Desai et al.

(10) Patent No.: US 11,438,502 B2
(45) Date of Patent: Sep. 6, 2022

(54) IMAGE SIGNAL PROCESSOR RESOURCE MANAGEMENT

(71) Applicant: QUALCOMM Incorporated, San Diego, CA (US)

(72) Inventors: Rohan Desai, San Diego, CA (US); Scott Cheng, Foothill Ranch, CA (US); Songhe Cai, San Diego, CA (US); Rakesh Sanam, Rancho Santa Fe, CA (US); Abhay Raut, San Diego, CA (US); Michael Lee Coulter, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/931,770

(22) Filed: May 14, 2020

(65) Prior Publication Data
US 2021/0360153 A1     Nov. 18, 2021

(51) Int. Cl.
*H04N 5/232*     (2006.01)

(52) U.S. Cl.
CPC ... *H04N 5/23232* (2013.01); *H04N 5/232939* (2018.08)

(58) Field of Classification Search
CPC ........ H04N 5/23232; H04N 5/232939; H04N 9/0451; H04N 9/04515; H04N 21/440281; H04N 21/85406; H04N 5/23229
See application file for complete search history.

(56) References Cited

U.S. PATENT DOCUMENTS

| | | | |
|---|---|---|---|
| 6,891,570 B2 | 5/2005 | Tantalo et al. |
| 8,094,991 B2 | 1/2012 | Taoka |
| 9,191,675 B2 | 11/2015 | Jiang et al. |
| 9,215,973 B2 | 12/2015 | Glukhovsky et al. |
| 9,621,741 B2 | 4/2017 | Caviedes et al. |
| 10,484,690 B2 | 11/2019 | Luo et al. |
| 10,547,779 B2 | 1/2020 | Wan et al. |
| 2013/0329075 A1 | 12/2013 | Liang et al. |
| 2015/0373293 A1 | 12/2015 | Vance et al. |
| 2017/0359524 A1 | 12/2017 | Hosono et al. |
| 2018/0091773 A1 | 3/2018 | Moussa |

OTHER PUBLICATIONS

International Search Report and Written Opinion—PCT/US2021/027274—ISA/EPO—dated Aug. 18, 2021.
Partial International Search Report—PCT/US2021/027274—ISA/EPO—dated Jun. 28, 2021.

*Primary Examiner* — Twyler L Haskins
*Assistant Examiner* — Angel L Garces-Rivera
(74) *Attorney, Agent, or Firm* — Qualcomm Incorporated

(57) ABSTRACT

Aspects relate to an image signal processor that processes frames at changing frame rates. An example method includes receiving, by an image signal processor, a first sequence of image frames from an image sensor at a first frame rate, processing each image frame of the first sequence of image frames at the first frame rate, and receiving from the image sensor an indication of a frame rate change from the first frame rate to a second frame rate. The method also includes configuring one or more filters of the image signal processor to process image frames from the image sensor in response to receiving the indication of the frame rate change from the image sensor, receiving a second sequence of image frames from the image sensor at the second frame rate, and processing each image frame of the second sequence of image frames at the second frame rate.

43 Claims, 8 Drawing Sheets

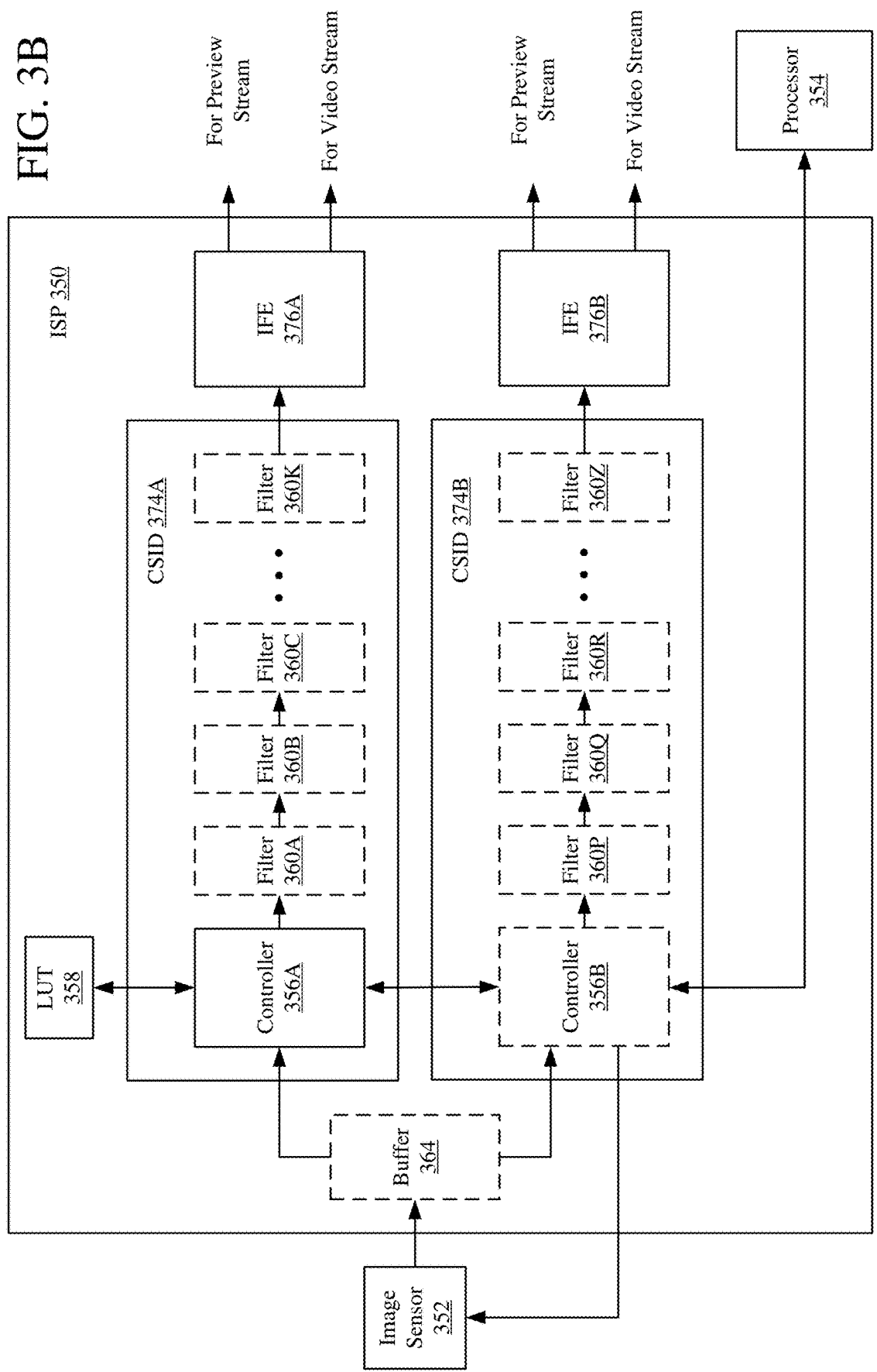

600

```
┌─────────────────────────────────────────────────────────────────┐
│ Determine a batch size based on an indication of a frame rate   │
│ change from the image sensor. 602                               │
│ ┌─────────────────────────────────────────────────────────────┐ │
│ │ Identify the batch size based on a VC ID or a stream ID in  │ │
│ │ an image frame received from the image sensor. 604          │ │
│ └─────────────────────────────────────────────────────────────┘ │
└─────────────────────────────────────────────────────────────────┘
                                │
                                ▼
┌─────────────────────────────────────────────────────────────────┐
│ Configure one or more filters of the ISP based on the frame     │
│ rate change. 606                                                │
│ ┌─────────────────────────────────────────────────────────────┐ │
│ │ Configure the ISP to communicate with the processor once    │ │
│ │ during a batch of image frames of the batch size. 608       │ │
│ └─────────────────────────────────────────────────────────────┘ │
└─────────────────────────────────────────────────────────────────┘
                                │
                                ▼
┌─────────────────────────────────────────────────────────────────┐
│ Communicate with the processor once during each batch of        │
│ image frames. 610                                               │
└─────────────────────────────────────────────────────────────────┘
```

```
┌─────────────────────────────────────────────────────────────┐
│   Determine a subset of a sequence of image frames at a     │
│   frame rate to be processed for a preview stream. 702      │
│ ┌─────────────────────────────────────────────────────────┐ │
│ │ Determine an interval for processing image frames for   │ │
│ │ the preview stream based on the frame rate. 704         │ │
│ │ ┌─────────────────────────────────────────────────────┐ │ │
│ │ │ Determine the interval based on a batch size. 706   │ │ │
│ │ └─────────────────────────────────────────────────────┘ │ │
│ └─────────────────────────────────────────────────────────┘ │
└─────────────────────────────────────────────────────────────┘
                              │
                              ▼
┌─────────────────────────────────────────────────────────────┐
│  Configure the ISP to process the subset of the sequence    │
│  for the preview stream. 708                                │
│ ┌─────────────────────────────────────────────────────────┐ │
│ │ Configure the ISP to process the interval of image      │ │
│ │ frames for the preview stream. 710                      │ │
│ └─────────────────────────────────────────────────────────┘ │
└─────────────────────────────────────────────────────────────┘
                              │
                              ▼
┌─────────────────────────────────────────────────────────────┐
│   Process the subset of the sequence for the preview        │
│   stream. 712                                               │
│ ┌─────────────────────────────────────────────────────────┐ │
│ │ Process the interval of image frames for the preview    │ │
│ │ stream. 714                                             │ │
│ └─────────────────────────────────────────────────────────┘ │
└─────────────────────────────────────────────────────────────┘
```

FIG. 7

IMAGE SIGNAL PROCESSOR RESOURCE MANAGEMENT

TECHNICAL FIELD

This disclosure relates generally to image or video capture devices, including resource management of an image signal processor that processes frames at changing frame rates.

BACKGROUND

Many devices include one or more image sensors that may be used for capturing a sequence of image frames for video. For example, a smartphone or tablet includes one or more image sensors for capturing video. A device may adjust the frame rate for capturing and processing image frames. For example, an image sensor may be able to capture image frames at multiple frame rates. The device instructs the image sensor to capture image frames at a specific frame rate, and the image sensor captures a sequence of image frames at the instructed frame rate. Each of the image frames are processed by an image signal processor, and the sequence of processed image frames may be encoded to generate a video.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Some aspects of the present disclosure relate to resource management of an image signal processor that processes frames at changing frame rates. An example method includes receiving, by an image signal processor, a first sequence of image frames from an image sensor at a first frame rate. The method also includes processing, by the image signal processor, each image frame of the first sequence of image frames at the first frame rate. The method also includes receiving, by the image signal processor from the image sensor, an indication of a frame rate change of the image sensor from the first frame rate to a second frame rate. The method further includes configuring one or more filters of the image signal processor to process image frames from the image sensor in response to receiving the indication of the frame rate change from the image sensor. The method also includes receiving, by the image signal processor, a second sequence of image frames from the image sensor at the second frame rate. The method further includes processing, by the image signal processor, each image frame of the second sequence of image frames at the second frame rate.

In some implementations, the indication of the frame rate change is included in metadata of an image frame after the first sequence of image frames from the image sensor. The method may also include indicating, by the image signal processor, the frame rate change to an application processor once during a batch of multiple image frames from the second sequence of image frames. A number of image frames in the batch may be determined by the image signal processor based on the received indication of the frame rate change. In some implementations, the number of image frames in the batch is based on a frame rate associated with the batch. In some implementations, the image signal processor indicates the frame rate change to the application processor after configuring the one or more filters.

The method may also include processing, by the image signal processor, a first interval of image frames of the first sequence of image frames to generate a first portion of a preview stream. The first interval is based on the first frame rate. The method may also include processing, by the image signal processor, a second interval of image frames of the second sequence of image frames to generate a second portion of the preview stream. The second interval is based on the second frame rate. The method may also include generating, by the image signal processor, a video stream including the processed first sequence of image frames and the processed second sequence of image frames, outputting, by the image signal processor, the preview stream for display, and outputting, by the image signal processor, the video stream. In some implementations, the preview stream is at a fixed frame rate and the video stream is at a variable frame rate.

The method may also include storing, by a memory, a look-up table mapping different frame rates to settings for configuring the one or more filters. The image signal processor uses the look-up table to configure the one or more filters based on the frame rate change. In some implementations, the look-up table further maps different frame rates to the number of image frames per batch for communicating, by the image signal processor, with the application processor.

The method may also include encoding, by an encoder, the first sequence of image frames and the second sequence of image frames to generate the video stream.

An example device includes an image signal processor configured to receive a first sequence of image frames from an image sensor at a first frame rate, process each image frame of the first sequence of image frames at the first frame rate, receive, from the image sensor, an indication of a frame rate change of the image sensor from the first frame rate to a second frame rate, configure one or more filters of the image signal processor to process image frames from the image sensor in response to receiving the indication of the frame rate change from the image sensor, receive a second sequence of image frames from the image sensor at the second frame rate, and process each image frame of the second sequence of image frames at the second frame rate. In some implementations, the indication of the frame rate change is included in metadata of an image frame after the first sequence of image frames from the image sensor.

The image signal processor may also be configured to indicate the frame rate change to an application processor once during a batch of multiple image frames from the second sequence of image frames. A number of image frames in the batch is determined by the image signal processor based on the received indication of the frame rate change. In some implementations, the number of image frames in the batch is based on a frame rate associated with the batch.

The image signal processor may be further configured to indicate the frame rate change to the application processor after configuring the one or more filters. The image signal processor may also be configured to process a first interval of image frames of the first sequence of image frames to generate a first portion of a preview stream (the first interval is based on the first frame rate), process a second interval of image frames of the second sequence of image frames to generate a second portion of the preview stream (the second interval is based on the second frame rate), generate a video stream including the processed first sequence of image frames and the processed second sequence of image frames, output the preview stream for display, and output the video stream. In some implementations, the preview stream is at a fixed frame rate and the video stream is at a variable frame rate.

In some implementations, the device also includes a memory to store a look-up table mapping different frame rates to settings for configuring the one or more filters. The image signal processor is further configured to use the look-up table to configure the one or more filters based on the frame rate change. The look-up table may also map different frame rates to the number of image frames per batch for communicating, by the image signal processor, with the application processor.

In some implementations, the device includes an encoder to encode the first sequence of image frames and the second sequence of image frames to generate the video stream. The device may include a display to display the preview stream. The device may also include the application processor to execute a camera application associated with the first sequence of image frames and the second sequence of image frames. The device may also include the image sensor configured to capture the first sequence of image frames, capture the second sequence of image frames, and indicate the frame rate change to the image signal processor.

An example non-transitory, computer-readable medium stores instructions that, when executed by one or more processors of a device, cause the device to receive, by an image signal processor, a first sequence of image frames from an image sensor at a first frame rate, process, by the image signal processor, each image frame of the first sequence of image frames at the first frame rate, receive, by the image signal processor from the image sensor, an indication of a frame rate change of the image sensor from the first frame rate to a second frame rate, configure one or more filters of the image signal processor to process image frames from the image sensor in response to receiving the indication of the frame rate change from the image sensor, receive, by the image signal processor, a second sequence of image frames from the image sensor at the second frame rate, and process, by the image signal processor, each image frame of the second sequence of image frames at the second frame rate. In some implementations, the indication of the frame rate change is included in metadata of an image frame after the first sequence of image frames from the image sensor.

Execution of the instructions may further cause the device to indicate, by the image signal processor, the frame rate change to an application processor once during a batch of multiple image frames from the second sequence of image frames. A number of image frames in the batch is determined by the image signal processor based on the received indication of the frame rate change. In some implementations, the number of image frames in the batch is based on a frame rate associated with the batch. In some implementations, the image signal processor indicates the frame rate change to the application processor after configuring the one or more filters.

Execution of the instructions may further cause the device to process, by the image signal processor, a first interval of image frames of the first sequence of image frames to generate a first portion of a preview stream (the first interval is based on the first frame rate), process, by the image signal processor, a second interval of image frames of the second sequence of image frames to generate a second portion of the preview stream (the second interval is based on the second frame rate), generate, by the image signal processor, a video stream including the processed first sequence of image frames and the processed second sequence of image frames, output, by the image signal processor, the preview stream for display, and output, by the image signal processor, the video stream. In some implementations, the preview stream is at a fixed frame rate and the video stream is at a variable frame rate.

Execution of the instructions may also cause the device to store, by a memory, a look-up table mapping different frame rates to settings for configuring the one or more filters. The image signal processor uses the look-up table to configure the one or more filters based on the frame rate change. The look-up table further may map different frame rates to the number of image frames per batch for communicating, by the image signal processor, with the application processor.

Execution of the instructions may also cause the device to encode, by an encoder, the first sequence of image frames and the second sequence of image frames to generate the video stream.

Another example device includes means for receiving a first sequence of image frames from an image sensor at a first frame rate, means for processing each image frame of the first sequence of image frames at the first frame rate, means for receiving, from the image sensor, an indication of a frame rate change of the image sensor from the first frame rate to a second frame rate, means for configuring one or more filters of an image signal processor to process image frames from the image sensor in response to receiving the indication of the frame rate change from the image sensor, means for receiving a second sequence of image frames from the image sensor at the second frame rate, and means for processing each image frame of the second sequence of image frames at the second frame rate. In some implementations, the indication of the frame rate change is included in metadata of an image frame after the first sequence of image frames from the image sensor.

The device may also include means for indicating the frame rate change to an application processor once during a batch of multiple image frames from the second sequence of image frames. A number of image frames in the batch is determined based on the received indication of the frame rate change. In some implementations, the number of image frames in the batch is based on a frame rate associated with the batch. In some implementations, the frame rate change is indicated to the application processor after configuring the one or more filters.

The device may also include means for processing a first interval of image frames of the first sequence of image frames to generate a first portion of a preview stream (the first interval is based on the first frame rate), means for processing a second interval of image frames of the second sequence of image frames to generate a second portion of the preview stream (the second interval is based on the second frame rate), means for generating a video stream including the processed first sequence of image frames and the processed second sequence of image frames, means for outputting the preview stream for display, and means for outputting the video stream. In some implementations, the preview stream is at a fixed frame rate and the video stream is at a variable frame rate. The device may also include means for storing a look-up table mapping different frame rates to settings for configuring the one or more filters. The look-up table is used to configure the one or more filters based on the frame rate change. In some implementations, the look-up table further maps different frame rates to the number of image frames per batch for communicating with the application processor.

The device may also include means for encoding the first sequence of image frames and the second sequence of image frames to generate the video stream.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 3B is a block diagram of another example image signal processor for processing frames captured at different frame rates.

FIG. 6 is an illustrative flow chart depicting an example operation for configuring communication between an image signal processor and a processor based on a batch size.

FIG. 7 is an illustrative flow chart depicting an example operation for generating a preview stream.

DETAILED DESCRIPTION

Figure 1:
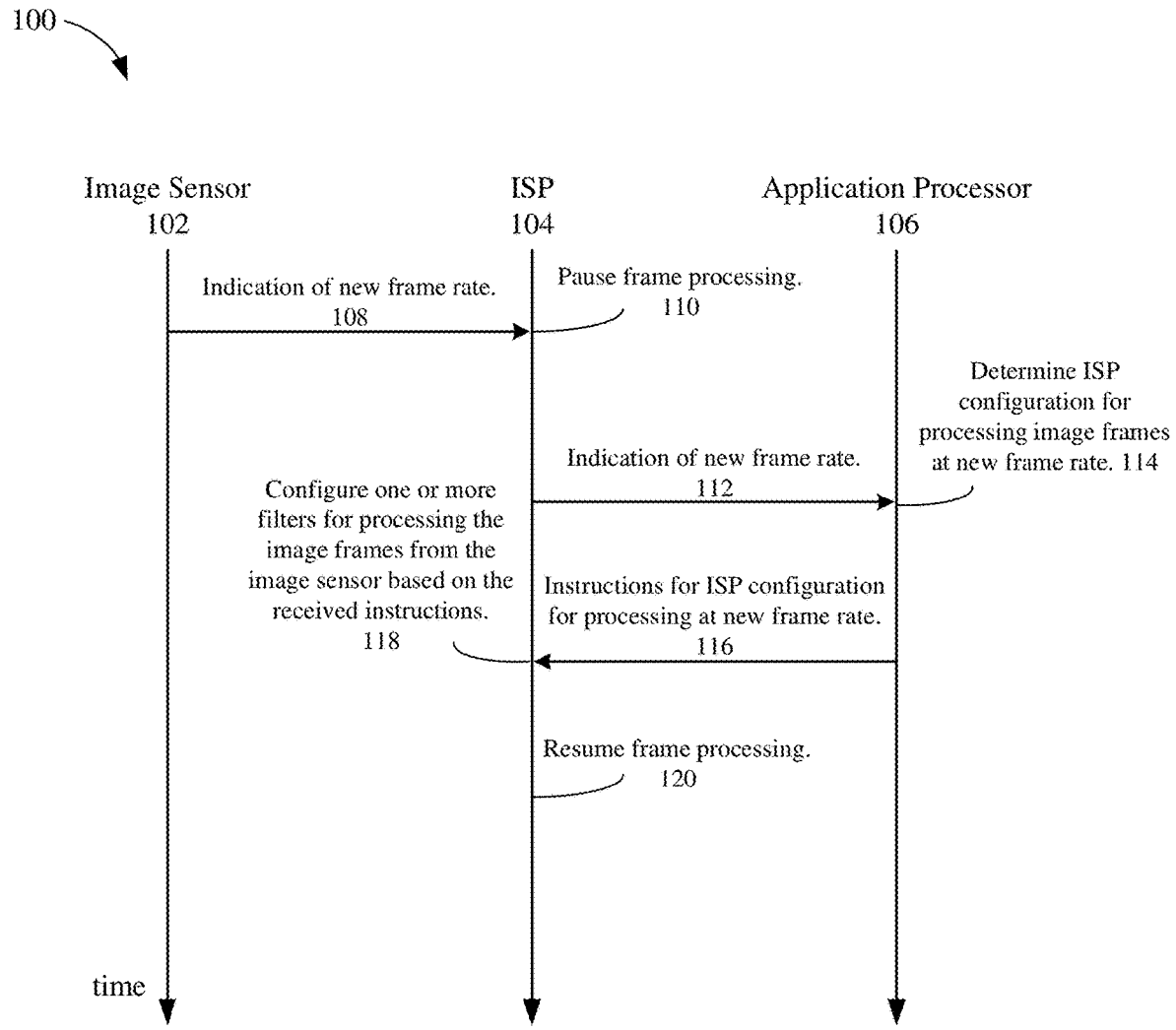
FIG. 1 is an example timing diagram depicting a change in frame rate initiated by an image sensor.

Aspects of the present disclosure may be used for image capture and processing devices for generating video. Some aspects include resource management of an image signal processor that processes frames at changing frame rates.

A device may be configured to adjust a frame rate for a video to be generated. For example, an application processor instructs an image signal processor (ISP) to adjust a frame rate for capturing an processing image frames. The ISP instructs an image sensor to adjust its frame rate at which it captures image frames, and the ISP configures one or more of its image processing filters (such as a noise reduction filter, an edge enhancement filter, a color balance filter, and so on) to process each of the captured image frames. The ISP may also configure one or more other components based on the frame rate (such as components for generating a preview video).

Some image sensors are now configured to adjust a frame rate without instruction from an image signal processor or an application processor. In some implementations, the image sensor may include or be coupled to one or more components measuring features of the received light, and a frame rate may be adjusted based on the measurements. For example, an integrated circuit may measure an intensity of the light received at the image sensor. If the light intensity drops below a threshold, the image sensor may reduce the frame rate in order to increase an exposure time per frame. Other measurements may include measuring a local motion, global motion, or color cast for the image sensor to determine whether the frame rate is to be changed. The image sensor captures the image frames at the new frame rate and outputs the image frames at the new frame rate to an ISP. In this manner, the ISP may receive a stream of image frames from the image sensor with a change in frame rates.

The image sensor indicates the frame rate change to the ISP. For example, the image sensor may be configured to provide image frames to the ISP in an exchangeable image frame (Exif) format. Each image frame in an Exif format includes an Exif header (which may include information regarding the image frame, such as location information from a global positioning sensor, time information from a clock, and so on). One or more image frames captured at the new frame rate may include an indication of the new frame rate in the Exif header. The ISP processes the Exif header and determines that the frame rate is changed. In this manner, a frame rate change may be initiated by the image sensor instead of the application processor.

A change in frame rate may require the ISP to adjust one or more filters (or other components of the image processing pipeline) for processing the image frames at the new frame rate. However, the ISP is configured based on instructions from the application processor. As a result, the ISP may need instructions from the application processor regarding a new configuration for processing the image frames when the image sensor changes its frame rate.

FIG. 1 is an example timing diagram 100 depicting a change in frame rate initiated by an image sensor 102. The image sensor 102 changes its frame rate, and the image sensor 102 indicates the change in frame rate to the ISP 104 (108). For example, a header of an image frame (captured at the new frame rate) that is output from the image sensor 102 to the ISP 104 indicates the new frame rate. In response to determining that the frame rate is changing, the ISP 104 pauses frame processing (110). For example, the ISP 104 processes the image frame header to determine that the frame rate has been changed at the image sensor 102. Since the ISP 104 is configured based on instructions from the application processor 106, the ISP 104 does not process the incoming image frames at the new frame rate.

With processing of the image frames paused, the ISP 104 indicates the change in frame rate to the application processor 106 (112). For example, the ISP 104 may generate and output one or more software instructions indicating the change in frame rate to the application processor 106. Different types of ISPs may be coupled with different types of application processors. In this manner, the ISP 104 may be configured to generate instructions in a generic or middleware format that is able to be processed by different types of application processors (including the application processor 106).

The application processor 106 may execute a camera application or other suitable software application for generating a video using the image sensor 102 and the ISP 104. The application processor 106 (executing the application) receives the indication of the frame rate change from the ISP 104. In some implementations, the application processor 106 may convert generic or middleware format instructions to instructions in a format specific to the application processor 106 or the application. The application processor 106 determines from the converted instructions that the frame rate of the image sensor 102 has changed. In response to determining that the frame rate has changed, the application processor 106 determines a configuration of the ISP 104 to process the image frames at the new frame rate (114). In some implementations, the ISP configuration may include changes to one or more image processing filters (such as a change to a noise reduction filter, a change to an edge enhancement filter, a change to a color balance filter, a change to a shading filter, a change to a geometric correction filter, reducing or increasing the number of filters to be applied to each image frame, changing the filters to be applied to each image frame, and so on).

A device may include or be coupled to a display to provide a preview of the stream of image frames captured by the image sensor 102. The preview may be at a lower frame rate than the image frames captured by the image sensor 102. For example, the image sensor 102 may capture image frames at 60 frames per second (fps) or 120 fps, and the displayed preview may be at 30 fps. The ISP 104 may be configured to process an interval of captured image frames to generate a preview stream that is displayed. For example, if the preview is at 30 fps and the image sensor captures frames at 60 fps, the ISP 104 may be configured to process every other frame for the preview stream. In some implementations, the ISP 104 generates two or more streams of image frames. For example, one stream may be a preview stream (for a preview to be displayed), and another stream may be a video stream (for a final video generated). The image frames at the interval in the stream of image frames from the image sensor 102 may be processed for the preview stream. All of the image frames (including the image frames at the interval in the stream as well as the remaining image frames) may be processed for the video stream. In some implementations, a first instance of image frames are processed for the preview stream, and a second instance of image frames are processed for the video stream. In comparing the preview stream to the final video stream, latency may be more important for the preview stream than image quality since the preview is to be displayed as soon as possible after capture of the image frames. To reduce latency, processing image frames for the preview stream may not include applying all of the filters applied in processing image frames for the video stream.

The interval at which to process image frames for generating the preview stream may be indicated by the application processor 106. In this manner, the ISP 104 may also not generate a preview stream when frame processing is paused. The ISP configuration determined by the application processor 106 may also include an indication of the interval at which to process image frames from the image sensor 102 to generate the preview stream.

After the application processor 106 determines the ISP configuration for processing the image frames at the new frame rate, the application processor 106 provides instructions to the ISP 104 for configuring the ISP 104 to process the image frames from the image sensor 102 at the new frame rate (116). In some implementations, the instructions are in a generic or middleware format (such as in a format used by the ISP 104 to indicate the change in frame rate to the application processor 106). The ISP 104 processes the instructions and configures the ISP 104 to process the image frames at the new frame rate (118). In adjusting the one or more filters, the ISP 104 may adjust the interval at which to process image frames for a preview stream. The ISP 104 may also adjust one or more of the image processing filters (such as a noise reduction filter, an edge enhancement filter, the number of filters, or which filters to apply) to process the image frames from the image sensor 102. After the ISP 104 configures the one or more filters based on the instructions from the application processor 106, the ISP 104 may resume processing the image frames from the image sensor 102 (120). The ISP 104 may discard image frames received from the image sensor 102 while processing is paused by the ISP 104.

Pausing image processing by the ISP 104 may be required for frame rates above a threshold frame rate because the time between image frame captures may not be a sufficient amount of time to (1) communicate between the ISP 104 and the application processor 106 and (2) configure, by the ISP 104, the one or more filters based on the communication. For example, a frame rate of 60 fps corresponds to less than 17 milliseconds (ms) between image frame captures, and a frame rate of 120 fps corresponds to approximately 8 ms between image frame captures. Communicating between the ISP 104 and the application processor 106 may require more than 8 ms (such as closer to 17 ms). For example, a hardware layer of the ISP 104 interacts with a software layer to communicate with the application processor 106, and latency in the software layer may cause the time required to be more than 8 ms. In this manner, the ISP 104 is not able to be configured for a next image frame at the new frame rate from the image sensor 102 without pausing processing of the image frames.

Pausing processing of the image frames (with the image frames received during the pause being discarded) negatively impacts a user experience, especially as frame rates continue to increase (such as image sensors configured to capture image frames at a frame rate of 240 fps, 480 fps, and so on). For example, a video including a change in frame rate may include a gap when processing is paused because of the change in frame rate. In another example, the preview stream may be suspended when processing is paused.

One solution is for a device to include multiple ISPs to have a dedicated ISP for each frame rate at which the image sensor may capture image frames. For example, if the image frame is capable of capturing image frames at 30 fps, 60 fps, 120 fps, 240 fps, 480 fps, and 960 fps, the device includes at least six ISPs (with one ISP for each of the frame rates). In this manner, the corresponding ISP may be used for processing received image frames captured at a specific frame rate. One problem is that all of the ISPs are initialized or otherwise using power, even when not being used. As a result, power usage may be increased by increasing the number of ISPs. Another problem is that increasing the number of ISPs increases the space required in the device. For example, more components (or more complex components) may be required to implement a device including multiple ISPs for different frame rates.

In some implementations, an ISP may be configured to process image frames captured at different frames rates. Resources of an ISP that processes frames at changing frame rates may be managed without interacting with an application processor. For example, the ISP may configure one or more filters without requiring instructions from the application processor to configure the ISP. Configuring the one or more filters may include adjusting the interval at which to process image frames for generating a preview stream. In this manner, the ISP may not pause processing of the image frames, and a video may not show an interruption (or may show a reduced interruption) when the frame rate changes. The preview stream may also not be interrupted (or include a reduced interruption) when the frame rate changes, as the ISP may adjust the interval at which image frames are processed without input from the application processor. If the ISP is able to configure itself for processing image frames captured at different frame rates, an application processor may not be required for at least some operations of the ISP.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device including or coupled to one or more image sensors capable of capturing a sequence of image frames for video (such as security systems, smartphones, tablets, laptop computers, digital video cameras, and so on). Further, aspects of the present disclosure may be implemented in devices having or coupled to image sensors of the same or different capabilities and characteristics (such as resolution, shutter speed, sensor type, and so on).

The terms "device" and "apparatus" are not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

Figure 2:
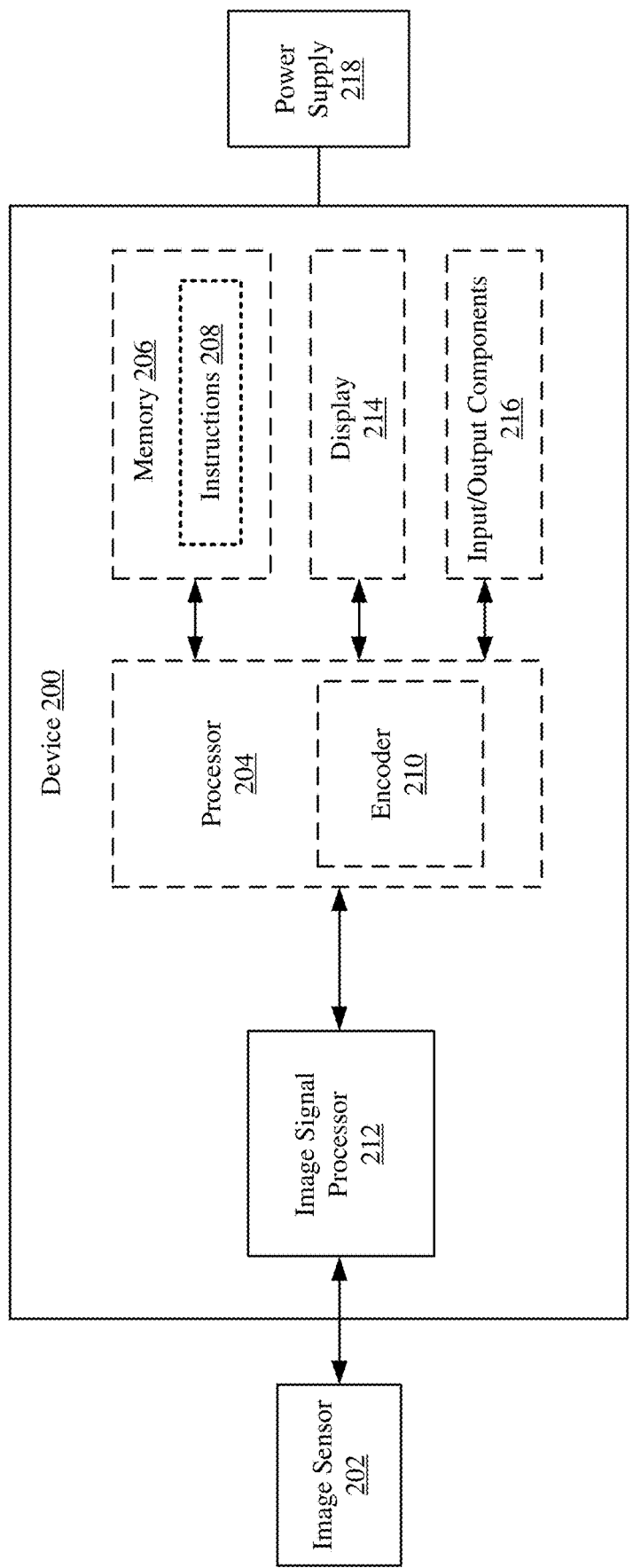
FIG. 2 is a block diagram of an example device for adjusting a frame rate.

FIG. 2 is a block diagram of an example device 200 for adjusting a frame rate for video. The example device 200 includes or is coupled to an image sensor 202. The example device 200 also includes a processor 204, a memory 206 storing instructions 208, and an ISP 212. In some implementations, the device 200 also includes or is coupled to a display 214 and includes a number of input/output (I/O) components 216. The device 200 may also include or be coupled to a power supply 218 for the device 200 (such as a battery or a component to couple the device 200 to an energy source). The device 200 may include additional features or components not shown. In one example, a wireless interface, which may include a number of transceivers and a baseband processor, may be included for a wireless communication device. In another example, one or more sensors (such as a gyroscope or a global positioning system (GPS) receiver) may be included in or coupled to the device.

The image sensor 202 may include one or more image sensors capable of capturing a succession of image frames for video. The image sensor 202 may include one or more image sensors of a camera module of the device 200 (such as a single camera module, a dual camera module, a triple camera module, and so on for a smartphone or other suitable device). The image sensor 202 may also include (or be coupled to) one or more lenses for focusing light, one or more apertures for receiving light, one or more shutters for blocking light when outside an exposure window, one or more color filter arrays (CFAs) for filtering light outside of specific frequency ranges, one or more analog front ends for converting analog measurements to digital information, or other suitable components for imaging. The device 200 may also include a flash, a depth sensor, a GPS, or other suitable components for imaging.

The image sensor 202 may be configured to adjust its frame rate without intervention from the ISP 212 or the processor 204. In some implementations, the image sensor 202 includes or is coupled to one or more components (such as including one or more integrated circuits or other sensors) to measure one or more characteristics of the light received. For example, the intensity of light may be measured. In another example, changes in light intensity across the image sensor may be measured over time to determine a global motion (caused by movement of the image sensor 202) or a local motion (caused by movement of one or more objects in the scene captured by the image sensor 202). The image sensor 202 may be configured to adjust the frame rate based on the one or more measurements. For example, the image sensor 202 may increase the frame rate if the global motion or local motion increases past a threshold. In another example, the image sensor 202 may decrease the frame rate is the light intensity decreases past a threshold. While some examples for adjusting an image sensor's frame rate are provided, any suitable measurements, thresholds, or other means to determine when to adjust the frame rate may be performed.

The image sensor 202 is configured to indicate the frame rate change to the ISP 212. In some implementations, the image sensor 202 captures and provides a first sequence of image frames at a first frame rate to the ISP 212. The image sensor 202 may change the first frame rate to a second frame rate and continue capturing image frames (such as a second sequence of image frames) at the second frame rate. The image sensor 202 provides the second sequence of image frames at the second frame rate to the ISP 212. In indicating the frame rate change by the image sensor 202 to the ISP 212, a header of one or more image frames in the second sequence may indicate a change in the frame rate. For example, the header may indicate the frame rate at which the image frame was captured. In another example, the header may indicate a difference between frame rates, a specific change in the frame rate, or other suitable manner in indicating the change. While the examples describe use of an Exif header for indicating a frame rate change by the image sensor 202 to the ISP 212, any suitable format header may be used to indicate the frame rate change. In addition or alternative to an image frame header, other components of the image frame may be used to indicate a frame rate change (such as a footer, a specific location in the body of the image frame, and so on). In addition or alternative to one or more components of an image frame, other means for indicating the frame rate change may be used. For example, the image sensor 202 may be configured to provide a proprietary or standardized signaling outside of the image frames to indicate a frame rate change.

The ISP 212 may include one or more image signal processors to process captured image frames provided by the image sensor 202. The ISP 212 is able to configure itself after a frame rate change indicated by the image sensor 202 without intervention from the processor 204. For example, the ISP 212 configures one or more filters without instruction from the processor 204 in response to determining a frame rate change from one or more Exif headers of image frames received from the image sensor 202. The ISP 212 may indicate the frame rate change to the processor 204 concurrently with or after configuring the ISP 212. For example, the ISP 212 may generate one or more generic or middleware instructions (such as based on a bridgeware between the processor 204 and the ISP 212), and the instructions may be provided to the processor 204 when the ISP 212 next communicates with the processor 204. The ISP 212 does not need to wait for the next communication with the processor 204 or a configuration instruction from the processor 204 to configure the ISP 212. For example, the ISP 212 may store in a memory (such as in a memory included in or coupled to the ISP 212, memory 206, or another suitable memory) different configuration profiles associated with different frame rates (or frame rate changes) of the image sensor 202. The ISP 212 may be configured to identify the profile to be accessed based on the indicated frame rate or frame rate change. The ISP 212 may access the identified profile, and the ISP 212 may configure one or more filters based on the accessed profile. The associations between the configuration profiles and the frame rates (or frame rate changes) may be stored in a look up table in the memory included in or coupled to the ISP 212.

In some implementations, the ISP 212 is also configured to control one or more aspects of the image sensor 202. For example, the ISP 212 may still indicate to the image sensor 202 a frame rate change initiated by the processor 204. The ISP 212 may be configured to control other aspects of the image sensor 202, including initialization, autofocus, autoexposure, or other functions, flash operation, a gain to be applied by an analog front end, and so on.

The ISP 212 may still be able to receive a configuration from the processor 204 (such as when a frame rate change is initiated by the processor 204). In this manner, the ISP 212 is able to configure itself based on an indication of the frame rate change from the image sensor 202 or based on instructions from the processor 204. The ISP 212 may be included with the processor 204 on a system on chip (SoC), or the ISP 212 may be separate from the processor 204 in device 200. The ISP 212 may also be configured to provide the stream of processed image frames for a video to the processor 204 for encoding or further processing (or another suitable component, such as the memory 206 for storage). In some implementations, the ISP 212 may output processed image frames to a memory (such as the memory 206 or a different memory accessed by the ISP 212 and the processor 204). For example, the ISP 212 may address the memory at specific sectors (such as at fixed intervals associated with the size of the image frame) to store each processed image frame. In some implementations, the ISP 212 may output a first group of processed image frames to a memory for the preview stream. The first group of processed image frames may be a subset of the image frames processed by the ISP 212, and the preview stream may be accessed by a graphics processor or other suitable component to display the preview stream on the display 214. The ISP 212 may also output a second group of processed image frames for the video stream. The second group of processed image frames may include all of the image frames processed by the ISP 212, and the video stream may be accessed by the processor 204 for further processing (such as for encoding and so on). The first group of processed image frames may be stored in a first portion of the memory, and the second group of processed image frames may be stored in a second portion of the memory.

In some aspects, the ISP 212 may execute instructions from a memory (such as instructions 208 from the memory 206, instructions stored in a separate memory coupled to or included in the ISP 212, or instructions provided by the processor 204 (after being converted to ISP 212 specific instructions, as applicable). In addition or alternative to the ISP 212 configured to execute software, the ISP 212 may include specific hardware (such as one or more integrated circuits (ICs)) to perform one or more operations described in the present disclosure.

The memory 206 may be a non-transient or non-transitory computer readable medium storing computer-executable instructions 208 to perform all or a portion of one or more operations described in this disclosure. In some implementations, the instructions 208 include a camera application (or other suitable application) to be executed by the device 200 for generating a video. The instructions 208 may also include other applications or programs executed by the device 200 (such as an operating system and specific applications other than for video generation). Execution of the camera application (such as by the processor 204) may cause the device 200 to generate a video using the image sensor 202 and the ISP 212. While the example device 200 is depicted as including a memory 206, in some implementations, the device 200 may not include the memory 206. For example, a memory may be outside the device 200, and the device 200 may be configured to access the memory.

The processor 204 may include one or more general purpose processors capable of executing scripts or instructions of one or more software programs (such as instructions 208) stored within the memory 206. For example, the processor 204 may include one or more application processors configured to execute the camera application (or other suitable application for generating video) stored in the memory 206. In executing the camera application, the processor 204 may be configured to instruct the ISP 212 to perform one or more operations with reference to the image sensor 202. For example, the processor 204 may be configured to instruct a frame rate change and an ISP configuration for processing the image frames captured at the changed frame rate. Execution of instructions 208 outside of the camera application may also cause the device 200 to perform any number of functions or operations. In some implementations, the processor 204 may include ICs or other hardware in addition to the ability to execute software to cause the device 200 to perform a number of functions or operations (including the operations described herein).

In some implementations, the processor 204 may include an encoder 210. The encoder 210 may be configured to encode the stream of processed image frames from the ISP 212 to generate a video. The video may then be provided to the memory 206 for storage. In some implementations, the video may be output to another suitable component, such as the display 214 or a graphics processor for display, an output component for output from the device 200, and so on. In some implementations, the encoder 210 may be embodied in software executed by the processor 204. For example, the encoder 210 may be embodied in the instructions 208 stored in the memory 206. In some other implementations, the encoder 210 may be embodied in hardware (such as one or more ICs) of the processor 204 or a combination of software and hardware. While shown to be included in the processor 204, the encoder 210 may be embodied in any suitable component of the device 200 or outside the device 200. For example, the encoder 210 may be embodied in the ISP 212 or a separate integrated circuit coupled to the ISP 212 for encoding the stream of processed image frames to generate the video. While the example device 200 is depicted as including a processor 204 in FIG. 2, in some implementations, the device 200 may not include the processor 204. For example, a processor may be outside the device 200, and the device 200 may be configured to communicate with the processor.

While shown to be coupled to each other via the processor 204 in the example of FIG. 2, the processor 204, the memory 206, the ISP 212, the optional display 214, and the optional I/O components 216 may be coupled to one another in various arrangements. For example, the processor 204, the memory 206, the ISP 212, the display 214, and/or the I/O components 216 may be coupled to each other via one or more local buses (not shown for simplicity).

The display 214 may be any suitable display or screen allowing for user interaction and/or to present items to the user (such as a preview of the image frames being captured by the image sensor 202). In some aspects, the display 214 is a touch-sensitive display. The I/O components 216 may be or include any suitable mechanism, interface, or device to receive input (such as commands) from the user and to provide output to the user. For example, the I/O components 216 may include (but are not limited to) a graphical user interface (GUI), keyboard, mouse, microphone and speakers, a squeezable bezel, one or more buttons (such as a power button), a slider or switch, and so on.

As noted above, the ISP 212 may include one or more ISPs for processing the image frames during the image processing pipeline. Also as noted above, the ISP 212 may be configured to process a subset of the image frames for generating a preview stream. For example, the ISP 212 may be configured to process each image frame at a defined interval from the sequence of image frames received from the image sensor 202. The interval may be based on the frame rate for the preview stream compared to the frame rate at which the image frames are captured. For example, The ISP 212 may also be configured to process all of the image frames for generating a video stream. For example, the ISP 212 may be configured to process each image frame received from the image sensor 202, and the processed image frames may be encoded (such as by the encoder 210) to generate the video. As noted herein, the ISP 212 may configure one or more of its filters (or other filters and components of the image processing pipeline) based on a frame rate change indicated by the image sensor 202.

As used herein, an interval may refer to a spacing (either temporally or spatially) between objects. For example, processing image frames at an interval of four image frames (which may also be referred to as processing every fourth image frame) may refer to processing a first image frame of a sequence of image frames, processing a fifth image frame of the sequence of image frames (four image frames from the first image frame), processing a ninth image frame of the sequence of image frames (four image frames from the fifth image frame), and so on. In another example, accessing a memory at an interval of 16 bytes (which may also be referred to as accessing every $16^{th}$ byte) may refer to accessing byte N of the memory, accessing byte N+16 of the memory, accessing byte N+32 of the memory, and so on.

Figure 3A:
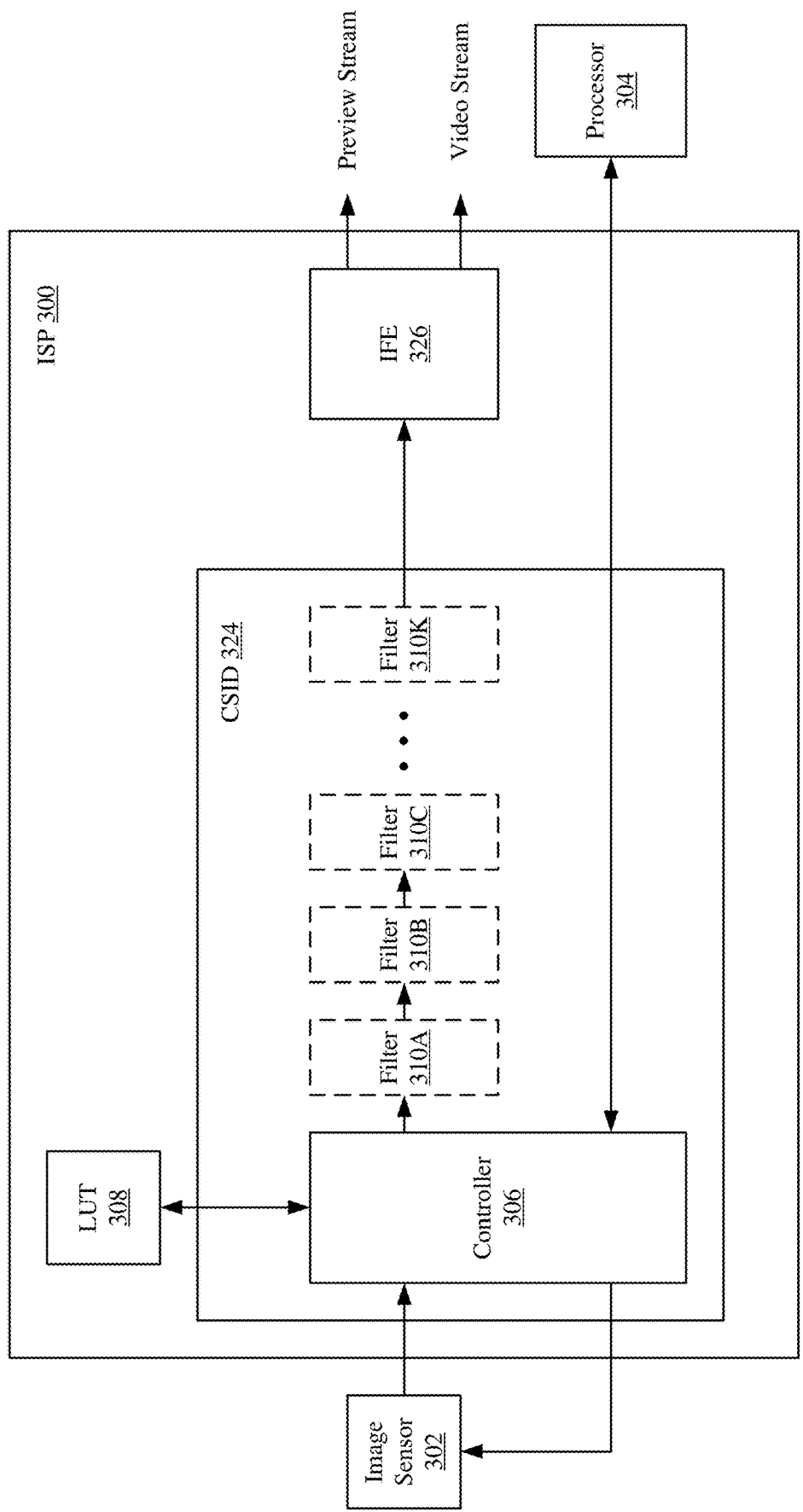
FIG. 3A is a block diagram of an example image signal processor for processing frames captured at different frame rates.

FIG. 3A is a block diagram of an example ISP 300 for processing frames captured at different frame rates. The ISP 300 may be an example implementation of the ISP 212 in FIG. 2. The ISP 300 is configured to receive one or more sequences of image frames captured by the image sensor 302. The image sensor 302 may be an example implementation of the image sensor 202 in FIG. 2. The ISP 300 may also be configured to output a first sequence of processed image frames for a preview stream and output a second sequence of processed image frames for a video stream. In this manner, the ISP 300 may be a single input multiple output (SIMO) component, with the single input being the stream of image frames from the image sensor 302 and the multiple outputs being the preview stream and the video stream of processed image frames. In some implementations, the processed image frames for a preview stream are output to a first portion of a memory (such as the memory 206 in FIG. 2 or a different memory coupled to the ISP 300 and the processor 304), and the processed image frames for a video stream are output to a second portion of the memory. The processor 304 may be an example implementation of the processor 204 in FIG. 2. In some implementations, the processor 304 may access the memory to obtain the processed image frames for the video stream, and the processor 304 may encode or further process the processed image frames. In some other implementations, the ISP 300 may provide the processed image frames for the video stream directly to the processor 304. The first portion of the memory storing the processed image frames for the preview stream may be accessed by a graphics processor or other suitable component for displaying a preview. In some other implementations, the ISP 300 may provide the processed image frames for the preview stream directly to a component for displaying the preview.

The ISP 300 includes a camera subsystem (CSID) 324 and an imaging front end (IFE) 326. In some implementations, the CSID 324 includes a controller 306. The controller 306 receives a stream of image frames from the image sensor 302. For example, the controller 306 may receive a first sequence of image frames captured at a first frame rate, and the controller 306 may receive a second sequence of image frames captured at a second frame rate. While not shown, an analog front end may convert analog image data of each image frame from the image sensor 302 to a digital format received by the CSID 324. The CSID 324 may process one or more image frame headers (or other image metadata) to determine the frame rate. If the frame rate changes, the CSID 324 may determine to configure the ISP 300 for the new frame rate. In some implementations, the CSID 324 includes a controller 306 to receive the image frames and process the image frame headers (or other image metadata) to determine the frame rate. The controller 306 may also determine to configure the ISP 300 for a new frame rate. Configuring the ISP 300 may include configuring one or more filters 310A-310K of the ISP 300. The filters 310A-310K may perform any suitable image processing function (such as color balancing, remosaicing or demosaicing, noise reduction, edge enhancement, color transform, shading correction, geometric correction, and so on). Configuring the one or more filters 310A-310K may include configuring one or more parameters for the filters (such as a threshold, a kernel, or other input affecting a filter) or configuring which filters are inactive or active for processing image frames. Configuring the ISP 300 may also include configuring other components for processing the image frames captured at the new frame rate. While the filters 310A-310K are depicted as being included in the CSID 324, one or more of the filters 310A-310K may be included in the IFE 326 or another portion of the ISP 300 or the image processing pipeline. In some implementations, configuring the ISP 300 also includes configuring the ISP 300 to process (or queue) only a portion of image frames for a preview stream. For example, the ISP 300 may be configured to use the image frames at a determined interval for the preview stream to compensate for a difference in frame rates between the captured image frames and the preview stream.

In some implementations, the frame rate of a preview may be static. For example, a preview's frame rate may remain at 30 fps while the frame rate of the incoming stream of image frames may change anywhere between, for example, 30 fps and 960 fps. If the incoming stream is captured at 30 fps, the preview stream may include an instance of each of the processed image frames (with the ISP 300 not skipping any image frames for the preview stream). If the incoming stream is captured at greater than 30 fps, the preview stream may include an instance of only a portion of the processed image frames (such as every other image frames when captured at 60 fps, every fourth image frame when captured at 120 fps, and so on). The controller 306 configuring one or more filters may include reducing the number of image frames to be processed or queued for the preview stream. In some implementations, the controller 306 determines an interval of image frames in the stream to be processed for the preview stream. The interval may correspond to a ratio between the preview frame rate and the frame rate of the incoming stream. For example, if the preview frame rate is 30 fps and the frame rate of the incoming stream is 120 fps, the ratio is 1:4 (30 fps to 120 fps). In this manner, the controller 306 determines that the preview stream is to include every fourth image frame processed by the ISP 300. The ISP 300 may thus be configured to filter out the remaining image frames from the preview stream. In some implementations, the ISP 300 includes (or is coupled to) a look up table (LUT) 308. The LUT 308 may include a mapping of the frame rate to an interval or ratio. In this manner, the controller 306 may obtain the interval or ratio from the LUT 308 to configure which image frames are to be processed or queued for the preview stream.

An ISP configuration may indicate what configurations are to be applied to the ISP 300 (or the image processing pipeline) for a specific frame rate. For example, an ISP configuration associated with a 60 fps frame rate may indicate the configurations of the filters 310A-310K, other components of the ISP 300 (or other portions of the image processing pipeline), or the interval for processing image frames for the preview stream. As noted above, the ISP 300 may include (or be coupled to) LUT 308 to store a mapping of frame rates to specific ISP configurations. For example, the image sensor 302 may be configured to capture image frames in a plurality of different frame rates. The LUT 308 may map at least one ISP configuration to each of the different frame rates. In an example implementation, the image sensor 302 may adjust its frame rate among 30 fps, 60 fps, 120 fps, 240 fps, 480 fps, and 960 fps. The LUT 308 stores a first ISP configuration mapped to 30 fps, a second ISP configuration mapped to 60 fps, a third ISP configuration mapped to 120 fps, a fourth ISP configuration mapped to 240 fps, and so on. The controller 306 determines a frame rate from a received image frame's header (or other metadata), looks up the frame rate in the LUT 308, and obtains the ISP configuration mapped to the frame rate in the LUT 308. The controller 306 then configures the ISP 300 (including the one or more filters 310A-310K and/or the interval for processing for the preview stream) based on the obtained ISP configuration.

As noted above, the image sensor 302 may be configured to adjust its frame rate without input from the ISP 300 or the processor 304, and the image sensor 302 may indicate the frame rate change to the ISP 300. In some examples, the image sensor 302 may indicate the frame rate change (such as indicating the new frame rate or difference in frame rates) in one or more image frame headers or other portions of the image frame metadata. The CSID 324 receives the image frames from the image sensor 302. For example, the CSID 324 may receive a first sequence of image frames captured at a first frame rate, and the CSID 324 may receive a second sequence of image frames captured at a second frame rate. One or more of the image frames in the second sequence may indicate the frame rate change from the first frame rate to the second frame rate (such as a header indicating the new frame rate). In some other implementations, the image sensor 302 may provide a separate signaling to the ISP 300 to indicate the frame rate change or new frame rate.

The IFE 326 may be configured to receive the processed image frames from the CSID 324 and output the processed image frames for the preview stream and for the video stream. In some implementations, the IFE 326 may include two queues or buffers: one for the processed image frames for the preview stream and one for the processed image frames for the video stream. The IFE 326 may store an instance of each processed image frame in the queue for the video stream, and the IFE 326 may store an instance of a processed image frame at a defined interval in the stream of processed image frames in the queue for the preview stream. Configuring the ISP 300 may include configuring the IFE 326 to adjust the interval at which processed image frames are queued for the preview stream. The IFE 326 may also be configured to output each processed image frame to a defined location in a memory (such as a defined sector to begin storing the processed image frame). For example, the IFE 326 may output the processed image frames for the preview stream to a first portion of the memory and the processed image frames for the video stream to a second portion of the memory.

In some other implementations, the CSID 324 provides a first set of processed image frames for the preview stream and a second set of processed image frames for the video stream. The IFE 326 may be configured to output the processed image frames to the appropriate location in a memory. In some other implementations, the IFE 326 may provide processed image frames to another suitable component (such as the processor 304 for the video stream or a graphics processor for the preview stream). In some implementations, the IFE 326 is also configured to process the one or more image frames received from the CSID 324. For example, the IFE 326 may include one or more of the filters 310A-310K.

In some implementations, the CSID 324 and the IFE 326 are included in a single ISP. In some other implementations, the ISP 300 may include multiple ISPs, with the CSID 324 being in one ISP and the IFE being in another ISP. In this manner, the ISP 300 may be a single chip, multiple chips, a single system on chip (SOC), multiple SOCs, or other suitable configuration for image frame processing.

In some implementations, the ISP 300 is configured to perform batch processing. The ISP 300 may not communicate with the processor 304 every image frame. Batch processing may refer to processing multiple image frames between instances of communicating with the processor 304. A batch may refer to the group of image frames processed between instances of communicating with the processor 304. A batch size may refer to the number of image frames in the batch. The CSID 324 (such as the controller 306) may also configure when to communicate with the processor 304 based on the batch size. For example, the ISP 300 and the processor 304 may communicate every image frame when the frame rate is 30 fps. When the frame rate is 60 fps, the ISP 300 and the processor 304 may communicate every other frame. When the frame rate is 120 fps, the ISP 300 and the processor 304 may communicate every fourth frame. When the frame rate is 240 fps, the ISP 300 and the processor 304 may communicate every eighth frame. When the frame rate is 480 fps, the ISP 300 and the processor 304 may communicate every sixteenth frame. When the frame rate is 960 fps, the ISP 300 and the processor 304 may communicate every thirty-second frame. In this manner, the period of time at which the ISP 300 and the processor 304 communicate may remain relatively static while the frame rate of the image sensor 302 changes. For example, if communication occurs every image frame when the frame rate is 30 fps, the interval between communicating may be approximately 16.66 ms. Adjusting the batch size may allow the interval to remain at approximately 16.66 ms when the frame rate of the image sensor 302 changes. In some implementations, the LUT 308 maps a frame rate to a batch size. In this manner, the CSID 324 may configure the ISP 300 communicating with the processor 304 based on the batch size obtained from the LUT 308. For example, the controller 306 may configure when it communicates with the processor 304.

The interval or ratio for processing or queuing image frames for the preview stream may be based on the batch size. For example, communicating with the processor 304 every frame may be based on a frame rate of 30 fps and the preview may be 30 fps. In this manner, the interval or ratio in the LUT 308 may be the batch size. In some other examples, the frame rate of the preview compared to the rate of communicating between the ISP 300 and processor 304 (which may be measured in number of frames) may be a fraction or multiple (such as ¼, ½, 2, 4, and so on). In this manner, the CSID 324 may determine the interval based on the batch size obtained from the LUT 308.

The ISP 300 may also be configured to instruct the image sensor 302 for one or more capture characteristics. For example, the ISP 300 may indicate to the image sensor 302 a requested frame rate change initiated by the processor 304. In some implementations, the processor 304 may indicate the frame change (and an ISP configuration) to the controller 306. In some other implementations, the ISP configuration may be determined using the LUT 308 based on the frame rate indicated by the processor 304. The controller 306 may indicate the frame rate change to the image sensor 302 and configure one or more filters of the ISP 300 for processing the image frames from the image sensor 302. As noted above, configuring one or more filters of the ISP 300 may include configuring the one or more filters 310A-310K, configuring the IFE 326 to provide a subset of processed image frames for a preview stream, configuring the CSID 324 (such as the controller 306) to communicate with the processor 304 at defined intervals, or configuring other components of the ISP 300. FIG. 3A depicts a simplified block diagram of the ISP 300 to describe aspects of the disclosure. Other components or a different configuration of components may be included in the ISP 300 for performing aspects of the present disclosure, and the ISP 300 and the present disclosure is not limited to the example depiction in FIG. 3A. In an example, while the LUT 308 is depicted as included in the ISP 300, the LUT may be stored in a memory outside of and coupled to the ISP 300. In another example, while one CSID and one IFE are depicted, the ISP 300 may include multiple CSIDs and/or multiple IFEs. An example ISP including multiple CSIDs and IFEs is depicted in FIG. 3B.

FIG. 3B is a block diagram of an example ISP 350 for processing frames captured at different frame rates. The ISP 350 may be similar to the ISP 300, except the ISP 350 may include a first CSID 374A and a first IFE 376A and a second CSID 374B and a second IFE 376B. The image sensor 352 may be similar to the image sensor 302 in FIG. 3A and may be an example implementation of the image sensor 202 in FIG. 2. The processor 354 may be similar to the processor 304 in FIG. 3A and may be an example implementation of the processor 204 in FIG. 2.

A single CSID (or IFE) may not have a sufficient rate of processing image frames as the frame rate increases. For example, an image sensor 352 may be configured to captured image frames at 480 fps (or more). A frame rate of 480 fps corresponds to approximately 2.1 ms between frames. However, a CSID and IFE may require more than 2.1 ms to process an image frame. In some implementations, the ISP 350 includes multiple CSIDs and IFEs (such as CSID 374A and IFE 376A and CSID 374B and IFE 376B). The CSID 374A and IFE 376A may process a first portion of image frames from the image sensor 352, and the CSID 374B and IFE 376B may process a second portion of image frames from the image sensor 352. For example, the first CSID 374A may process every other image frame (such as by applying the one or more filters 360A-360K), and the second CSID 374B may process the remaining image frames (such as by applying the one or more filters 360P-360Z). The IFE 376A provides at least some of the first portion of processed image frames for the preview stream and all of the first portion of processed image frames for the video stream. The IFE 376B provides at least some of the second portion of processed image frames for the preview stream and all of the second portion of processed image frames for the video stream. For example, each IFE 376A and 376B may be configured to address specific sectors of a memory to ensure processed frames are stored in order for both the preview stream and the video stream. In this manner, image frames may be processed concurrently to increase the rate at which the ISP 350 may process image frames.

In some implementations, the ISP 350 may include a buffer 364 or other suitable component for temporarily holding the image frames from the image sensor 352. Each of the controllers 356A and 356B may then obtain the suitable image frames to be processed by the corresponding CSID 374A or CSID 374B. The ISP configurations stored in the LUT 358 may indicate how frames are to be portioned for processing by the multiple components. In this manner, the controller 356A (or controller 356B) may configure the buffer 364 or other components for routing the image frames to the CSIDs 374A and 374B for processing.

The CSIDs 374A and 374B and IFEs 376A and 376B may be used in any suitable manner for processing image frames at different frame rates. For example, the CSID 374A and IFE 376A may be able to process all image frames when the frame rate is below 480 fps (such as at 30 fps, 60 fps, 120 fps, or 240 fps). However, the CSID 374A and IFE 376A may have difficulties processing all image frames when the frame rate is 480 fps or higher. In some implementations, the ISP 350 may use only one CSID and one IFE (such as CSID 374A and IFE 376A) when the frame rate is below a threshold frame rate (such as below 480 fps). In this manner, configuring the ISP 350 may also include activating or deactivating the CSID 374B and IFE 376B based on the frame rate. For example, the controller 356A may instruct a controller 356B to prepare the CSID 374B and IFE 376B to process image frames. In another example, a single controller 356A may be used to control and configure both CSIDs and both IFEs. In some other implementations, the CSIDs 374A and 374B may alternate image frames for processing independent of the frame rate. In this manner, both CSIDs and IFEs may be active for all frame rates.

The ISP 350 may also be configured to instruct the image sensor 352 for one or more capture characteristics. For example, the ISP 350 may indicate to the image sensor 352 a requested frame rate change initiated by the processor 354. In some implementations, the processor 354 may indicate the frame change (and an ISP configuration) to the ISP 350. In some other implementations, the ISP configuration may be determined using the LUT 358 based on the frame rate indicated by the processor 354. While FIG. 3B depicts the processor 354 communicating with the controller 356B, the processor 354 may provide instructions to any suitable component (such as the controller 356A). Similarly, while FIG. 3B depicts the image sensor 352 receiving instructions from the controller 356B, the image sensor 352 may receive instructions from any suitable component (such as the controller 356A).

As shown in the example depictions of an ISP in FIG. 3A and FIG. 3B, the ISP 212 in FIG. 2 may include different configurations to process image frames from the image sensor 202 and communicate with the processor 204. While the below examples are described with reference to the ISP 300 in FIG. 3A to describe aspects of the disclosure, any suitable configuration of an ISP may be used (including the example configuration of ISP 350 in FIG. 3B).

As noted above, the frame rate change or new frame rate may be indicated in an image frame header or other suitable metadata. In some implementations, when a stream of image frames has the frame rate changed, the image frames captured at the new frame rate may be associated with a different stream or session identification (ID) (referred to herein as a stream ID) than the image frames previously captured at the old frame rate. In this manner, the ISP 300 may associate a first sequence of image frames captured at a first frame rate with a first stream ID and a second sequence of image frames captured at a second frame rate with a second stream ID. In this manner, the ISP 300 may manage and delineate when the frame rate change occurs in the stream of image frames.

Figure 4:
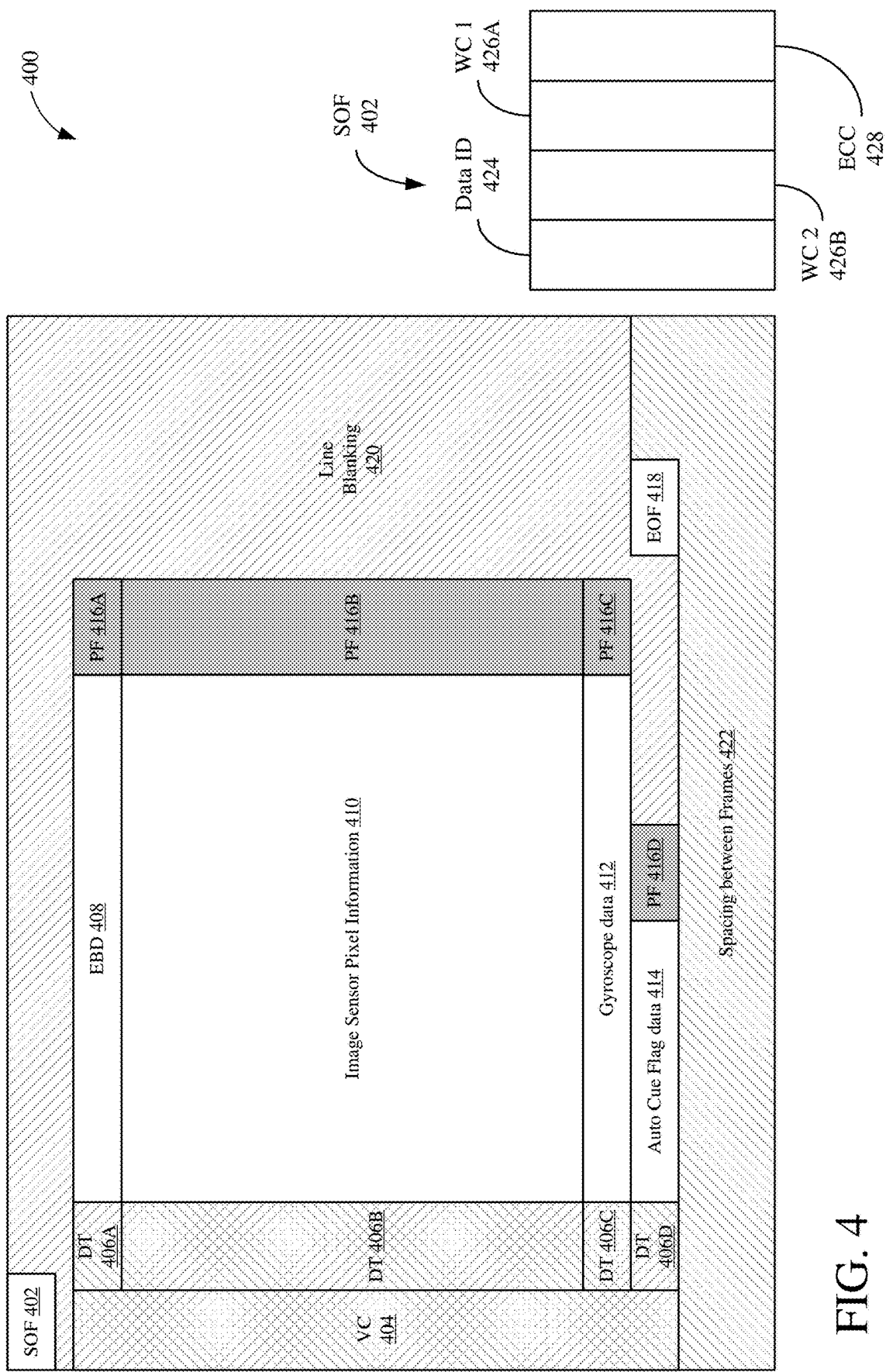
FIG. 4 is a depiction of example contents of an image frame provided by an image sensor to an image signal processor.

FIG. 4 is a depiction of example contents of an image frame 400 provided by an image sensor to an ISP. The image frame 400 begins with a start of frame (SOF) 402. At least a portion of the SOF 402 may include a Data ID field 424, a word count (WC) field 426 (including a first portion WC 1 426A and a second portion WC 2 426B), and an error correction code (ECC) 428. The Data ID field 424 may include a bit sequence or code indicating the beginning of the image frame 400. In some implementations, the WC 1 426A includes a frame count for the image frame 400. The WC 2 426B may include a zero padding or other unused value. In some other implementations, the WC 2 426B may also include a frame count (such as a second instance of the frame count or combined with WC 1 426A for a single frame count). In some implementations, the WC field 426 includes 16 bits (with subfields WC1 426A including bits 0-7 and WC2 426B including bits 8-15). Bits 0-7 may include the frame count. Bits 8-15 may include a fixed value (such as zeros or a known bit pattern). The ECC 428 may include an error correction code to be used to determine if any errors are in the received image frame 400. In some implementations, the SOF 402 may include other fields, and only a portion of the SOF 402 may be depicted in FIG. 4.

The image frame may also include a packet header. In the depicted image frame 400, the packet header may include the video coding (VC) field 404 and the dequantization (or decoding) tables (DT) 406 (for example, including DT 406A, DT 406B, DT 406C, and DT 406D). The VC field 404 may indicate a format in which the image frames are provided by the image sensor to the ISP. DT 406A may be used for decoding the border (EBD 408) of the image frame portion including image sensor pixel information 410. DT 406B may be used for decoding the image sensor pixel information 410. DT 406C may be used for decoding the gyroscope (or other sensor) data 412. DT 406D may be used to decode the Auto Cue Flag data 414.

For the portions of the image frame 400 including non-zero information (such as fields 404-414), the portions may include a packet footer (PF) 416 (for example, PF 416A, PF 416B, PF 416C, and PF 416D) appended to their ends. For example, the EBD 408 may include a PF 416A, the image sensor pixel information 410 may include a PF 416B, the gyroscope data 412 may include a PF 416C, and the Auto Cue Flag data 414 may include a PF 416D. The PF 416 may indicate the end of a row for the field or another delineation of the field from the remainder of the image frame 400. The remaining portion of the image frame 400 between the SOF 402 and an end of frame (EOF) 418 (outside of fields 404-416) may include a line blanking 420. The line blanking 420 may be zero padding or other data to fill the unused portion of the image frame 400. As shown, there may be a spacing 422 between the image frame 400 and a next image frame in the stream.

In some implementations, the image sensor assigns a stream ID to the stream of image frames. To indicate a frame rate change, the image sensor may assign a different stream ID to image frames captured at the new frame rate. For example, a stream may include a first sequence of image frames captured at a first frame rate and a second sequence of image frames captured at a second frame rate. The first sequence of image frames may be associated with a first stream ID, and the second sequence of image frames may be associated with a second stream ID. The stream ID (such as the value or the formatting) may correspond to the frame rate. For example, a portion of the stream ID may include a number of bits indicating the frame rate.

In some implementations, the stream ID associated with the image frame 400 is included in the header, the EBD 408, or another suitable portion of the image frame 400. For example, the stream ID may be included in the EBD 408. The format of the stream ID in the EBD 408 (such as the length, ordering of bits, information indicated in the stream ID, and so on) may be programmable. In addition, or to the alternative, the location of the stream ID in the EBD 408 may be programmable. The image sensor and the ISP may be configured to use any suitable format stream ID and location of the stream ID for the image sensor to indicate the frame rate to the ISP.

In some implementations of a programmable stream ID, the ISP may include a number of programmable registers to be used in determining the location of the stream ID and the format of the stream ID in the image frame 400. One register may be a stream ID length register. In some implementations, the stream ID length register is 2 bits and indicates the number of bytes in the stream ID. In this manner, the stream ID length register may indicate up to four different byte lengths. For example, 00 may indicate no stream ID included in the EBD 408 (length of 0 bytes), 01 may indicate a stream ID length of 1 byte, 10 may indicate a steam ID length of 2 bytes, and 11 may indicate a stream ID length of 3 bytes. In some implementations, 11 may be reserved to indicate something other than byte length (such as a secondary location of the stream ID other than in the EBD).

Other registers may include a stream ID x offset register or a stream ID y offset register to indicate the location of the stream ID in the EBD 408. The EBD 408 includes one or more lines including a plurality of bits. As shown, the number of bits per line may be the same as the number of bits per line of the image sensor pixel information 410. However, the number of bits per line may be any suitable number. The stream ID x offset register may indicate an offset of the stream ID from the beginning of a line in the EBD 408. The offset may be measured in bytes. In some implementations, the stream ID x offset register is 16 bits and indicates the number of bytes from the beginning of a line in the EBD 408 that the stream ID is offset. The EBD 408 may be two or more lines. The stream ID y offset register may indicate an offset of the stream ID from the first line in the EBD 408. The offset may be measured in lines. In some implementations, the stream ID y offset register is 6 bits and indicates the number of lines from the first line in the EBD 408 that the stream ID is offset. While the stream ID x offset and y offset registers are described as indicating a location of the stream ID in the EBD 408, in some implementations, the stream ID x offset and y offset registers may be used to indicate a location of the stream ID in the image sensor pixel information 410. For example, the image sensor may place a stream ID in a location in the image sensor pixel information 410, and the registers may be used by the ISP to determine the location of the stream ID. In some other implementations, the registers may be used to indicate a location of the stream ID in other portions of the image frame 400.

The stream ID may be associated with a VC ID included in the VC field 404. The VC ID may be assigned by the image sensor based on the video coding used or other characteristics of the image frame capture (such as time, session number, frame rate, and so on). Referring back to FIG. 3A, the ISP 300 may decode the incoming image frame 400 to identify the VC ID (in the VC field 404) and the stream ID (such as based on the number of registers indicating the location and length of the stream ID). The LUT 308 may map at least a portion of the VC ID and/or the stream ID to an ISP configuration and batch size. A CSID 324 may use the VC ID and/or the stream ID to look up the ISP configuration in the LUT 308. For example, if the VC ID or the stream ID changes, the CSID 324 may obtain a new ISP configuration from the LUT 308 and configure the ISP 300 based on the new ISP configuration.

In some other implementations, the VC ID may be used to determine a stream ID. For example, the image sensor may change the VC ID based on a change in frame rate. In this manner, the VC ID value may be associated with the frame rate. The changes to the VC ID based on the frame rate may be predetermined such that the stream ID may be determined from the VC ID. In some implementations, the LUT 308 may include a mapping of VC IDs to stream IDs (or frame rates) for the ISP 300 to determine the stream ID or frame rate from the VC ID.

In some implementations, an image processing pipeline (including the ISP 300) may process image frames from multiple image sensors. Incoming image frames from different image sensors may thus include different VC IDs. The ISP 300 may use the VC IDs to manage and separate the image frames to the respective streams after processing (such as store the processed image frames in respective areas of a memory for the different streams). For example, the ISP 300 may receive two streams with two different VC IDs, and the image processing pipeline may support processing different image frames with the two different VC IDs. For example, processing of the image frames from the two streams may be interleaved. The IFE 326 may include two buffers or queues associated with the two different VC IDs, and the processed image frames may be placed in the corresponding buffer. The IFE 326 may then output the buffered image frames from the buffer associated with the stream to corresponding locations in a memory.

Referring back to FIG. 2, the ISP 212 may not communicate with the processor 204 every image frame. For example, if the frame rate is a multiple of 30 fps, the batch of image frames to be processed by the ISP 212 between communications with the processor 204 may be a similar multiple of 30 fps. The processor 204 may indicate an ISP configuration in response when the communication occurs to indicate the change in frame rate. The ISP 212 is already configured using a stored ISP configuration (such as obtained from an LUT 308 in FIG. 3A). However, the ISP configuration from the processor 204 may differ from the stored ISP configuration. For example, if the device 200 is in a power save mode, the processor 204 may indicate that the video is to be in a lower frame rate than being used by the image sensor 202 to capture image frames. In another example, the processor 204 may indicate a difference to one or more filters in the image processing pipeline. In some implementations, the ISP 212 compares the received ISP configuration to the stored ISP configuration to identify any differences. If one or more differences are identified, the ISP 212 may adjust the one or more filters based on the identified differences. The comparison may be performed while processing of the image frames continues. In this manner, the ISP 212 does not need to pause processing, and a resulting video or preview is not interrupted.

As noted herein, an ISP may be configured to manage its resources (such as its filters, one or more CSIDs, one or more IFEs, and so on) based on an indicated frame rate change from the image sensor. While some examples of image frame formats, ISP configurations, and device configurations are depicted, any suitable device or component configuration and format of information may be used to perform aspects of the present disclosure. Example device 200 depicted in FIG. 2 and example ISP 300 depicted in FIG. 3A are referred to in describing the below example methods for the ISP to manage its resources. Use of FIG. 2 and FIG.

3A is for teaching aspects of the present disclosure, but operations of the below methods are not limited to being performed by the specific configuration of the device 200 or the ISP 300.

Figure 5:
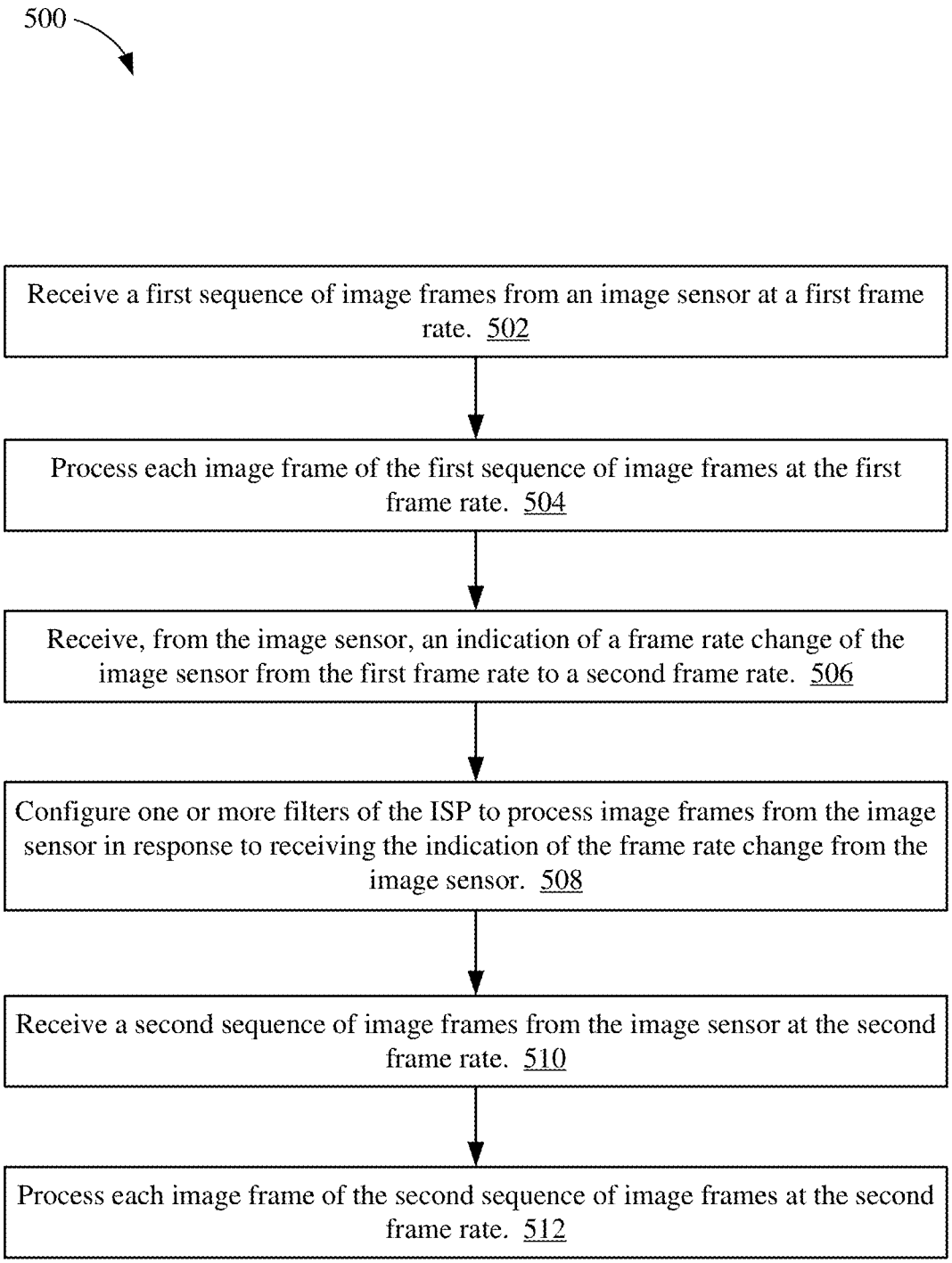
FIG. 5 is an illustrative flow chart depicting an example operation for image frame processing for video.

FIG. 5 is an illustrative flow chart depicting an example operation 500 for image frame processing for video. The image sensor 202 is configured to adjust its frame rate without intervention from the ISP 212 or the processor 204. The ISP 212 is configured to adjust processing of the image frames from the image sensor 202 based on a change in frame rate without intervention from the processor 204.

At 502, the ISP 212 receives a first sequence of image frames from the image sensor 202. The first sequence of image frames are captured at a first frame rate. At 504, the ISP 212 processes each image frame of the first sequence of image frames at the first frame rate. In some implementations, the ISP 212 is already configured to process image frames captured at the first frame rate. For example, the ISP 212 may be previously configured based on a frame rate previously indicated by the processor 204 or previously indicated by the image sensor 202. In this manner, the ISP 212 may process each of the image frames in the first sequence of image frames (504). In some implementations, the ISP 212 processes each of the image frames of the first sequence for generating a video stream. The ISP 212 may also process at least a subset of the image frames of the first sequence for generating a preview stream.

At 506, the ISP 212 receives, from the image sensor 202, an indication of a frame rate change of the image sensor 202 from the first frame rate to a second frame rate. The frame rate may be indicated in the image frame's metadata, such as a header or EBD. In some implementations, one or more image frames captured at the second frame rate may include an indication of the frame rate change to the second frame rate. For example, a stream ID or a VC ID in an image frame may be used to indicate the frame rate at which the image frame is captured. The ISP 212 may identify the stream ID or VC ID in the image frame, and the stream ID or VC ID may be used to obtain an ISP configuration. For example, a CSID 324 or controller 306 (FIG. 3A) may identify the stream ID or VC ID and use the stream ID or VC ID to obtain an ISP configuration from the LUT 308. The ISP configuration may indicate the frame rate or otherwise allow the ISP 212 to process image frames at the new frame rate. In some other implementations, the image sensor 202 may indicate the frame rate to the ISP 212 via signaling outside of the image frames.

At 508, the ISP 212 configures one or more filters of the ISP 212 to process image frames from the image sensor 202 in response to receiving the indication of the frame rate change from the image sensor 202. In some implementations, the ISP 212 may configure one or more filters of the ISP 212 based on the ISP configuration. For example, the ISP 300 (such as the CSID 324 or controller 306) may configure one or more filters 310A-310K. The ISP may also configure a batch size for when the ISP communicates with the processor (such as the ISP communicating with the processor once every batch of image frames). The ISP may further configure the interval for processing image frames for a preview stream. The ISP may also configure other components, including CSIDs, IFEs, output modules, and so on. For example, if the ISP includes a second CSID and a second IFE, the ISP may activate or deactivate the second CSID and the second IFE based on the frame rate of the received image frames.

At 510, the ISP 212 receives a second sequence of image frames from the image sensor 202 at the second frame rate.

In some implementations, the indication received in step 506 is included in one or more image frames included in the second sequence of image frames, and the ISP 212 processes the image frames (including the one or more image frames from which the frame rate may be determined) of the second sequence (512). For example, the ISP 212 is configured at step 508 for processing image frames at the second frame rate. All of the image frames of the second sequence may be processed for generating a video stream, and at least a subset of the image frames of the second sequence may be processed for generating a preview stream.

While not shown, the processed image frames of the video stream may be encoded to generate a video. In some implementations, the image frames may be encoded at the ISP 212. In some other implementations, the image frames may be provided by the ISP 212 to the processor 204 (such as via a memory accessed by both the ISP 212 and the processor 204) to be encoded by the encoder 210. The video may include different portions at different frame rates. Processed image frames of a preview stream may be provided to a display 214, the processor 204, a graphics processor, or another suitable component (such as via a memory accessed by both the ISP 212 and the suitable component) for displaying a preview to a device user. The preview may be at a static frame rate (with the interval for processing image frames adjusted based on a change in frame rate).

As noted above, an ISP 212 may not communicate with the processor 204 every image frame. For example, when the frame rate is greater than 30 fps, the ISP 212 may communicate with the processor 204 once during processing of a batch of image frames (with the batch size greater than one). In this manner, the ISP 212 may process one or more image frames at a new frame rate before communicating the new frame rate to the processor 204.

FIG. 6 is an illustrative flow chart depicting an example operation 600 for configuring communication between an image signal processor 212 and a processor 204 based on a batch size. At 602, the ISP 212 determines a batch size based on an indication of a frame rate change from the image sensor. An image frame may include an indication of a new frame rate, and the ISP 212 may use the indication to determine a batch size. For example, the ISP 300 (such as the CSID 324 or controller 306) may determine a batch size from the ISP configuration from the LUT 308 or based on the new frame rate indicated by the ISP configuration. In some implementations, the ISP 212 may identify the batch size based on a VC ID or a stream ID in an image frame received from the image sensor 202 (604). For example, the ISP 300 may identify the VC ID or the stream ID from the image frame and determine a batch size from the ISP configuration obtained from the LUT 308 based on the VC ID or the stream ID.

At 606, the ISP 212 configures one or more filters based on the frame rate change. The step may be similar to step 508 in FIG. 5. For example, the ISP 300 may obtain an ISP configuration from the LUT 308. The ISP configuration may include a batch size. The ISP 300 then may configure the one or more filters (such as the one or more filters 310A-310K or other suitable filters or components) using the ISP configuration (including the batch size). In configuring the one or more filters, the ISP 212 may configure itself to communicate with the processor 204 once during a batch of image frames of the batch size (608). For example, communicating with the processor 204 to indicate the frame rate, frames buffered for output, any errors, or other information may be at an interval of at least 16.66 ms (such as corresponding to a 30 fps frame rate) or another suitable interval. When the frame rate increases such that the time between frames is less than the interval, the determined batch size (such as from the LUT 308 in FIG. 3A) may indicate the number of image frames to be processed, by the ISP 212 per communication with the processor 204, to be greater than one. For example, 60 fps may correspond to a batch size of 2, 120 fps may correspond to a batch size of 4, and so on. In this manner, the rate at which the ISP 212 communicates with the processor 204 may remain consistent. In some implementations, the interval may correspond to a minimum time needed for communicating with the processor 204 (such as based on software or hardware latencies). The batch size may ensure that the time between communications is greater than such minimum time.

At 610, the ISP 212 communicates with the processor 204 once during each batch of image frames. In some implementations, after the one or more filters of the ISP 212 are configured, the ISP 212 may communicate the frame rate change to the processor 204. In some implementations, the communication may be an interrupt request (IRQ). However, the communication may be any suitable format for the ISP 212 to indicate the frame rate and other information to the processor 204. The processor may respond to an IRQ with ISP configuration information or another suitable acknowledgement to the request.

As noted above, the ISP 212 may be configured to generate a preview stream and a video stream. In some implementations, the video stream may include all image frames captured by the image sensor 202 and processed by the ISP 212. The preview stream may include a subset of the image frames captured by the image sensor 202 and processed by the ISP 212. For example, the preview stream may be at a lower frame rate than the frame rate of the image sensor. To generate a preview stream from a sequence of image frames captured at a higher frame rate, the ISP 212 may process only a subset of the image frames in the sequence (and discard the other image frames for the preview stream). In some implementations, the ISP 212 processes an interval of image frames (such as every other image frame, every fourth image frame, and so on) to generate the preview stream at the desired frame rate. A stream of image frames from the image sensor 202 may include a first sequence of image frames captured at a first frame rate and a second sequence of image frames captured at a second frame rate (with the image sensor 202 indicating a frame rate change). The ISP 212 may configure the subset of image frames to be processed for each sequence. In this manner, the ISP 212 may keep the frame rate of the preview stream consistent across multiple sequences captured at different frame rates.

FIG. 7 is an illustrative flow chart depicting an example operation 700 for generating a preview stream. The image sensor 202 provides a stream of image frames to the ISP 212, with the frame rate changing during capture of the stream of image frames. In this manner, the image sensor 202 provides a first sequence of image frames captured at a first frame rate and a second sequence of image frames captured at a second frame rate.

At 702, the ISP 212 determines a subset of image frames of a sequence captured at a frame rate to be processed for a preview stream. For example, the ISP 212 may be previously configured to process a first subset of image frames for the first sequence of image frames captured at the first frame rate. The ISP 212 then begins to receive the second sequence of image frames captured at the second frame rate (with the image sensor 202 indicating the frame rate change from the first frame rate to the second frame rate). The ISP 212 may thus adjust the subset of image frames to be processed for the second sequence of image frames in response to the frame rate change. For example, the ISP 212 may adjust the subset to be processed to maintain a consistent frame rate for the preview stream across the sequences of image frames captured at different frame rates.

In some implementations, the ISP 212 may determine an interval for processing image frames for the preview stream based on the frame rate of the sequence of image frames (704). For example, if the frame rate of the sequence of image frames is 240 fps and the frame rate of the preview stream is 30 fps, the ISP 212 may determine the interval for processing to be every eighth image frame (30/240). In some implementations, the ISP 300 (FIG. 3A) determines a VC ID or stream ID from one or more image frames in the sequence and determines the interval based on a LUT 308 using the VC ID or stream ID mapped to an interval.

In some implementations, the ISP 212 may determine the interval based on a batch size (706). The interval may correspond to a batch size for the frame rate. For example, the frame rate of the preview stream and the interval for communicating with the processor 204 may be static with reference to each other. In this manner, the ISP 212 may determine which image frames of a sequence to process for a preview stream based on the batch size used to determine when to communicate with the processor 204. The LUT 308 in FIG. 3A may include a mapping of a frame rate indication (such as a VC ID or stream ID) to a batch size, and the batch size may be mapped or otherwise correspond to a specific interval. For example, if communication with the processor 204 is approximately every 16.66 ms (corresponding to a 30 fps frame rate) and the frame rate of the preview stream is 30 fps, the batch size is the same as the interval. For example, if the image sensor captures image frames at 120 fps, the batch size may be four frames and the interval for processing image frames for the preview stream may be every fourth frame.

In response to determining the subset of image frames of the sequence to be processed, the ISP 212 is configured to process the subset of image frames for the preview stream (708). In some implementations, the ISP 212 is configured to process the interval of image frames for the preview stream (710). In some examples, the ISP 212 may process all image frames for the video stream. The ISP 212 may then output an instance of each processed image frame at the interval to generate the preview stream. For example, if the frame rate of incoming frames from the image sensor 202 is 60 fps and the frame rate of the preview is 30 fps, the ISP 212 may generate a video stream including a processed image frame for each received image frame. The ISP 212 may also generate a preview stream including an instance of the first processed image frame, the third processed image frame, and so on, skipping every other image frame to compensate for the difference in frame rates between the incoming image frames from the image sensor 202 and the preview. In this manner, two instances of the first image frame may exist (one for the video stream and one for the preview stream), one instance of the second image frame may exist (one for only the video stream), two instances of the third image frame may exist, and so on.

In some implementations, the IFE 326 is configured by the ISP 300 to generate multiple instances of processed image frames for the appropriate streams. For example, the IFE 326 may receive the processed image frames from the CSID 324 and store an instance of each processed image frame in a buffer for the video stream. The IFE 326 may also store instances of a subset of processed image frames in a buffer for the preview stream. The ISP 300 may configure which instances are to be generated or stored for the preview stream based on the determined interval or determined batch size from the ISP configuration. The IFE 326 may also include one or more filters to be applied. For example, the IFE 326 may include one or more filters to be applied to the image frames for the video stream to improve image quality. However, to improve latency for the preview, the IFE 326 may not apply the one or more filters to the image frames for the preview stream. In this manner, the IFE 326 may be configured to output processed image frames for the preview stream before outputting corresponding processed image frames for the video stream.

After the ISP 212 configures itself for processing the subset of image frames in the sequence, the ISP 212 processes the subset of image frames for the preview stream (712). In some implementations, the ISP 212 may process the interval of image frames for the preview stream (714). For example, the IFE 326 may generate instances of the processed image frames for the preview stream to output the preview stream and the video stream. The preview stream including the processed image frames may be provided to a display 214, the processor 204, a graphics processor, or another suitable component (such as via a memory accessible by both the ISP 212 and the component) for displaying a preview to a user.

Various techniques for an ISP to manage its resources based on a frame rate change indicated by an image sensor are described. As noted, the ISP does not require intervention from an application processor to manage its resources based on a frame rate change. The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 206 in the example device 200 of FIG. 2) comprising instructions 208 that, when executed by the ISP 212, the processor 204, or another suitable component, cause the device 200 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 204 or the ISP 212 in the example device 200 of FIG. 2. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As noted above, while the present disclosure shows illustrative aspects, it should be noted that various changes and modifications could be made herein without departing from the scope of the appended claims. For example, how to configure the filters and determine the size of a batch of image frames is described as being based on accessing the LUT 308 or LUT 358 (FIG. 3A and FIG. 3B) in the examples above. However, in some other implementations, an ISP may determine a size of a batch or configure the filters based on an equation and the frame rate. Any other suitable means may be used to determine a size of a batch or how to configure the filters. As such, an ISP is not limited to using a LUT. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A method for digital image processing, comprising:
   receiving, by an image signal processor, a first sequence of image frames from an image sensor at a first frame rate;
   processing, by the image signal processor, each image frame of the first sequence of image frames at the first frame rate;
   receiving, by the image signal processor from the image sensor, an indication of a frame rate change of the image sensor from the first frame rate to a second frame rate;
   configuring, based on the frame rate change, one or more filters of the image signal processor to process image frames from the image sensor in response to receiving the indication of the frame rate change from the image sensor;
   receiving, by the image signal processor, a second sequence of image frames from the image sensor at the second frame rate; and
   processing, by the image signal processor, each image frame of the second sequence of image frames at the second frame rate.

2. The method of claim 1, wherein the indication of the frame rate change is included in metadata of an image frame after the first sequence of image frames from the image sensor.

3. The method of claim 1, further comprising:
indicating, by the image signal processor, the frame rate change to an application processor once during a batch of multiple image frames from the second sequence of image frames, wherein a number of image frames in the batch is determined by the image signal processor based on the received indication of the frame rate change.

4. The method of claim 3, wherein the number of image frames in the batch is based on a frame rate associated with the batch.

5. The method of claim 3, wherein the image signal processor indicates the frame rate change to the application processor after configuring the one or more filters.

6. The method of claim 1, further comprising:
processing, by the image signal processor, a first interval of image frames of the first sequence of image frames to generate a first portion of a preview stream, wherein the first interval is based on the first frame rate;
processing, by the image signal processor, a second interval of image frames of the second sequence of image frames to generate a second portion of the preview stream, wherein the second interval is based on the second frame rate;
generating, by the image signal processor, a video stream including the processed first sequence of image frames and the processed second sequence of image frames;
outputting, by the image signal processor, the preview stream for display; and
outputting, by the image signal processor, the video stream.

7. The method of claim 6, wherein the preview stream is at a fixed frame rate and the video stream is at a variable frame rate.

8. The method of claim 6, further comprising encoding, by an encoder, the first sequence of image frames and the second sequence of image frames to generate the video stream.

9. The method of claim 1, further comprising:
storing, by a memory, a look-up table mapping different frame rates to settings for configuring the one or more filters, wherein the image signal processor uses the look-up table to configure the one or more filters based on the frame rate change.

10. The method of claim 9, wherein the look-up table further maps different frame rates to the number of image frames per batch for communicating, by the image signal processor, with an application processor.

11. A device for digital image processing, comprising:
an image signal processor configured to:
receive a first sequence of image frames from an image sensor at a first frame rate;
process each image frame of the first sequence of image frames at the first frame rate;
receive, from the image sensor, an indication of a frame rate change of the image sensor from the first frame rate to a second frame rate;
configure, based on the frame rate change, one or more filters of the image signal processor to process image frames from the image sensor in response to receiving the indication of the frame rate change from the image sensor;
receive a second sequence of image frames from the image sensor at the second frame rate; and
process each image frame of the second sequence of image frames at the second frame rate.

12. The device of claim 11, wherein the indication of the frame rate change is included in metadata of an image frame after the first sequence of image frames from the image sensor.

13. The device of claim 11, wherein the image signal processor is further configured to:
indicate the frame rate change to an application processor once during a batch of multiple image frames from the second sequence of image frames, wherein a number of image frames in the batch is determined by the image signal processor based on the received indication of the frame rate change.

14. The device of claim 13, wherein the number of image frames in the batch is based on a frame rate associated with the batch.

15. The device of claim 13, wherein the image signal processor is further configured to indicate the frame rate change to the application processor after configuring the one or more filters.

16. The device of claim 11, wherein the image signal processor is further configured to:
process a first interval of image frames of the first sequence of image frames to generate a first portion of a preview stream, wherein the first interval is based on the first frame rate;
process a second interval of image frames of the second sequence of image frames to generate a second portion of the preview stream, wherein the second interval is based on the second frame rate;
generate a video stream including the processed first sequence of image frames and the processed second sequence of image frames;
output the preview stream for display; and
output the video stream.

17. The device of claim 16, wherein the preview stream is at a fixed frame rate and the video stream is at a variable frame rate.

18. The device of claim 16, further comprising an encoder to encode the first sequence of image frames and the second sequence of image frames to generate the video stream.

19. The device of claim 16, further comprising a display to display the preview stream.

20. The device of claim 13, further comprising the application processor to execute a camera application associated with the first sequence of image frames and the second sequence of image frames.

21. The device of claim 11, further comprising:
a memory to store a look-up table mapping different frame rates to settings for configuring the one or more filters, wherein the image signal processor is further configured to use the look-up table to configure the one or more filters based on the frame rate change.

22. The device of claim 21, wherein the look-up table further maps different frame rates to the number of image frames per batch for communicating, by the image signal processor, with an application processor.

23. The device of claim 11, further comprising the image sensor configured to:
capture the first sequence of image frames;
capture the second sequence of image frames; and
indicate the frame rate change to the image signal processor.

24. A non-transitory, computer readable medium storing instructions, that when executed by one or more processors of a device, cause the device to:
receive, by an image signal processor, a first sequence of image frames from an image sensor at a first frame rate;

process, by the image signal processor, each image frame of the first sequence of image frames at the first frame rate;

receive, by the image signal processor from the image sensor, an indication of a frame rate change of the image sensor from the first frame rate to a second frame rate;

configure, based on the frame rate change, one or more filters of the image signal processor to process image frames from the image sensor in response to receiving the indication of the frame rate change from the image sensor;

receive, by the image signal processor, a second sequence of image frames from the image sensor at the second frame rate; and process, by the image signal processor, each image frame of the second sequence of image frames at the second frame rate.

25. The computer readable medium of claim 24, wherein the indication of the frame rate change is included in metadata of an image frame after the first sequence of image frames from the image sensor.

26. The computer readable medium of claim 24, wherein execution of the instructions further causes the device to:
indicate, by the image signal processor, the frame rate change to an application processor once during a batch of multiple image frames from the second sequence of image frames, wherein a number of image frames in the batch is determined by the image signal processor based on the received indication of the frame rate change.

27. The computer readable medium of claim 26, wherein the number of image frames in the batch is based on a frame rate associated with the batch.

28. The computer readable medium of claim 26, wherein the image signal processor indicates the frame rate change to the application processor after configuring the one or more filters.

29. The computer readable medium of claim 24, wherein execution of the instructions further causes the device to:
process, by the image signal processor, a first interval of image frames of the first sequence of image frames to generate a first portion of a preview stream, wherein the first interval is based on the first frame rate;
process, by the image signal processor, a second interval of image frames of the second sequence of image frames to generate a second portion of the preview stream, wherein the second interval is based on the second frame rate;
generate, by the image signal processor, a video stream including the processed first sequence of image frames and the processed second sequence of image frames;
output, by the image signal processor, the preview stream for display; and
output, by the image signal processor, the video stream.

30. The computer readable medium of claim 29, wherein the preview stream is at a fixed frame rate and the video stream is at a variable frame rate.

31. The computer readable medium of claim 29, wherein execution of the instructions further causes the device to encode, by an encoder, the first sequence of image frames and the second sequence of image frames to generate the video stream.

32. The computer readable medium of claim 24, wherein execution of the instructions further causes the device to:
store, by a memory, a look-up table mapping different frame rates to settings for configuring the one or more filters, wherein the image signal processor uses the look-up table to configure the one or more filters based on the frame rate change.

33. The computer readable medium of claim 32, wherein the look-up table further maps different frame rates to the number of image frames per batch for communicating, by the image signal processor, with an application processor.

34. A device for digital image processing, comprising:
means for receiving a first sequence of image frames from an image sensor at a first frame rate;
means for processing each image frame of the first sequence of image frames at the first frame rate;
means for receiving, from the image sensor, an indication of a frame rate change of the image sensor from the first frame rate to a second frame rate;
means for configuring, based on the frame rate change, one or more filters of an image signal processor to process image frames from the image sensor in response to receiving the indication of the frame rate change from the image sensor;
means for receiving a second sequence of image frames from the image sensor at the second frame rate; and
means for processing each image frame of the second sequence of image frames at the second frame rate.

35. The device of claim 34, wherein the indication of the frame rate change is included in metadata of an image frame after the first sequence of image frames from the image sensor.

36. The device of claim 34, further comprising:
means for indicating the frame rate change to an application processor once during a batch of multiple image frames from the second sequence of image frames, wherein a number of image frames in the batch is determined based on the received indication of the frame rate change.

37. The device of claim 36, wherein the number of image frames in the batch is based on a frame rate associated with the batch.

38. The device of claim 36, wherein the frame rate change is indicated to the application processor after configuring the one or more filters.

39. The device of claim 34, further comprising:
means for processing a first interval of image frames of the first sequence of image frames to generate a first portion of a preview stream, wherein the first interval is based on the first frame rate;
means for processing a second interval of image frames of the second sequence of image frames to generate a second portion of the preview stream, wherein the second interval is based on the second frame rate;
means for generating a video stream including the processed first sequence of image frames and the processed second sequence of image frames;
means for outputting the preview stream for display; and
means for outputting the video stream.

40. The device of claim 39, wherein the preview stream is at a fixed frame rate and the video stream is at a variable frame rate.

41. The device of claim 39, further comprising means for encoding the first sequence of image frames and the second sequence of image frames to generate the video stream.

42. The device of claim 34, further comprising:
means for storing a look-up table mapping different frame rates to settings for configuring the one or more filters, wherein the look-up table is used to configure the one or more filters based on the frame rate change.

43. The device of claim 42, wherein the look-up table further maps different frame rates to the number of image frames per batch for communicating with an application processor.

* * * * *